(12) United States Patent
Choate et al.

(10) Patent No.: US 7,628,169 B2
(45) Date of Patent: Dec. 8, 2009

(54) SAFETY RELIEF VALVE HAVING A LOW BLOW-DOWN VALUE AND SPRING THEREFORE

(75) Inventors: Jeremy R. Choate, Stafford, TX (US);
Michael J. Easton, Edmond, OK (US);
Wesley L. Taylor, Bethany, OK (US)

(73) Assignee: Mercer Valve Company, Inc., Oklahoma City, OK (US)

( * ) Notice: Subject to any disclaimer, the term of this patent is extended or adjusted under 35 U.S.C. 154(b) by 0 days.

(21) Appl. No.: 11/840,053

(22) Filed: Aug. 16, 2007

(65) Prior Publication Data

US 2008/0017257 A1   Jan. 24, 2008

Related U.S. Application Data

(60) Division of application No. 10/601,304, filed on Jun. 20, 2003, which is a continuation-in-part of application No. 10/364,290, filed on Feb. 10, 2003, now abandoned.

(51) Int. Cl.
*F16K 17/04* (2006.01)

(52) U.S. Cl. .................. 137/469; 137/529; 137/540; 251/118

(58) Field of Classification Search ............. 137/469, 137/524, 529, 540, 542; 251/118, 127, 337; 267/174, 175, 177, 180
See application file for complete search history.

(56) References Cited

U.S. PATENT DOCUMENTS

| 194,157 A | 8/1877 | Ludlum | |
|---|---|---|---|
| 1,082,762 A | 12/1913 | Parkin | |
| 1,560,829 A | 11/1925 | Kraut | |
| 1,779,573 A | 10/1930 | Volckhausen | |
| 1,878,128 A | 9/1932 | Griswold | |
| 1,890,822 A * | 12/1932 | Murray | 267/151 |
| 2,151,501 A | 3/1939 | Corcoran | |
| 2,335,829 A | 11/1943 | McBride | |
| 2,547,862 A | 4/1951 | Gilmore | |
| 2,568,026 A | 9/1951 | Pigott | |
| 2,634,122 A * | 4/1953 | Wolfard | 267/151 |

(Continued)

OTHER PUBLICATIONS

Kren, Lawrence, "Machined springs are cut out for custom jobs," www.machinedesign.com, 3 pages (Aug. 17, 2000).

(Continued)

*Primary Examiner*—John Rivell
(74) *Attorney, Agent, or Firm*—Brinks Hofer Gilson & Lione; Steven P. Shurtz

(57) ABSTRACT

A safety relief valve is provided that comprises a body comprising a chamber therein and an inlet and an outlet, the inlet comprising an inlet valve seat; a disk member closable on the inlet valve seat; and a mechanism in the body biasing the disk member to rest on the inlet valve seat with a set force such that when the pressure in the inlet exceeds a set pressure resulting from the set force, the disk member is lifted from the inlet valve seat, the mechanism comprising a combination of a coil spring and one or more disk springs stacked in series with the coil spring.

A method of preparing a coil spring for use in a pressure relief valve comprises measuring the spring rate of the coil spring and; modifying the spring so as to modify its spring rate to be within ±2% of a desired spring rate.

13 Claims, 12 Drawing Sheets

U.S. PATENT DOCUMENTS

| | | | | |
|---|---|---|---|---|
| 2,686,534 | A | 8/1954 | Montelius | |
| 2,695,032 | A | 11/1954 | Kmiecik | |
| 2,704,549 | A | 3/1955 | Strnad | |
| 2,779,585 | A * | 1/1957 | Loxham | 267/151 |
| 3,027,911 | A | 4/1962 | Gilmore | 137/469 |
| 3,084,710 | A | 4/1963 | Gondek | |
| 3,130,748 | A | 4/1964 | Weingartner | |
| 3,145,732 | A | 8/1964 | Joles | |
| 3,145,983 | A | 8/1964 | Higbee | |
| 3,406,712 | A | 10/1968 | Weise | |
| 3,411,530 | A | 11/1968 | Powell | |
| 3,464,440 | A | 9/1969 | Nordt | |
| 3,487,852 | A | 1/1970 | Kikendall | |
| 3,507,486 | A * | 4/1970 | Schwaller | 267/151 |
| 3,664,362 | A | 5/1972 | Weise | |
| 3,762,434 | A | 10/1973 | Allen et al. | |
| 4,057,072 | A | 11/1977 | Cook | |
| 4,325,468 | A | 4/1982 | Siorek | |
| 4,446,886 | A | 5/1984 | Taylor et al. | |
| 4,530,373 | A | 7/1985 | Bork, Jr. et al. | |
| 4,566,486 | A | 1/1986 | Taylor et al. | |
| 4,586,569 | A | 5/1986 | Hyde | |
| 4,588,163 | A | 5/1986 | Christensen | |
| 4,591,314 | A | 5/1986 | Weber | |
| 4,678,004 | A | 7/1987 | Rosenberg | |
| 4,696,320 | A | 9/1987 | Bull | |
| 4,799,506 | A | 1/1989 | Taylor | |
| 4,881,571 | A | 11/1989 | Reip | |
| 4,932,434 | A | 6/1990 | Taylor | |
| 4,981,215 | A * | 1/1991 | Ilic | 267/151 |
| 5,370,151 | A | 12/1994 | Smart | |
| 5,722,645 | A | 3/1998 | Reitter | |
| 5,820,102 | A | 10/1998 | Borland | |
| 6,095,183 | A | 8/2000 | Taylor et al. | |
| 6,161,571 | A | 12/2000 | Taylor | |
| 6,516,828 | B2 | 2/2003 | Choate et al. | |
| 6,938,641 | B2 | 9/2005 | Abe | |

OTHER PUBLICATIONS

A.H. Church, "Altering wound springs to modify their deflection rates", 1961, McGraw-Hill Book Company, Inc., Spring Design and Application, 174-175.

* cited by examiner

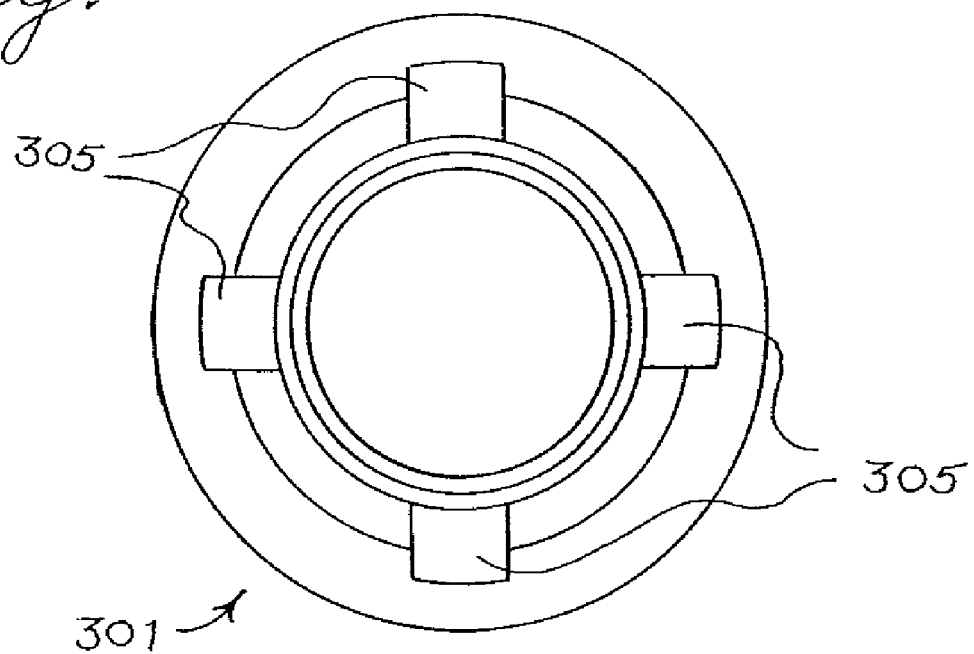
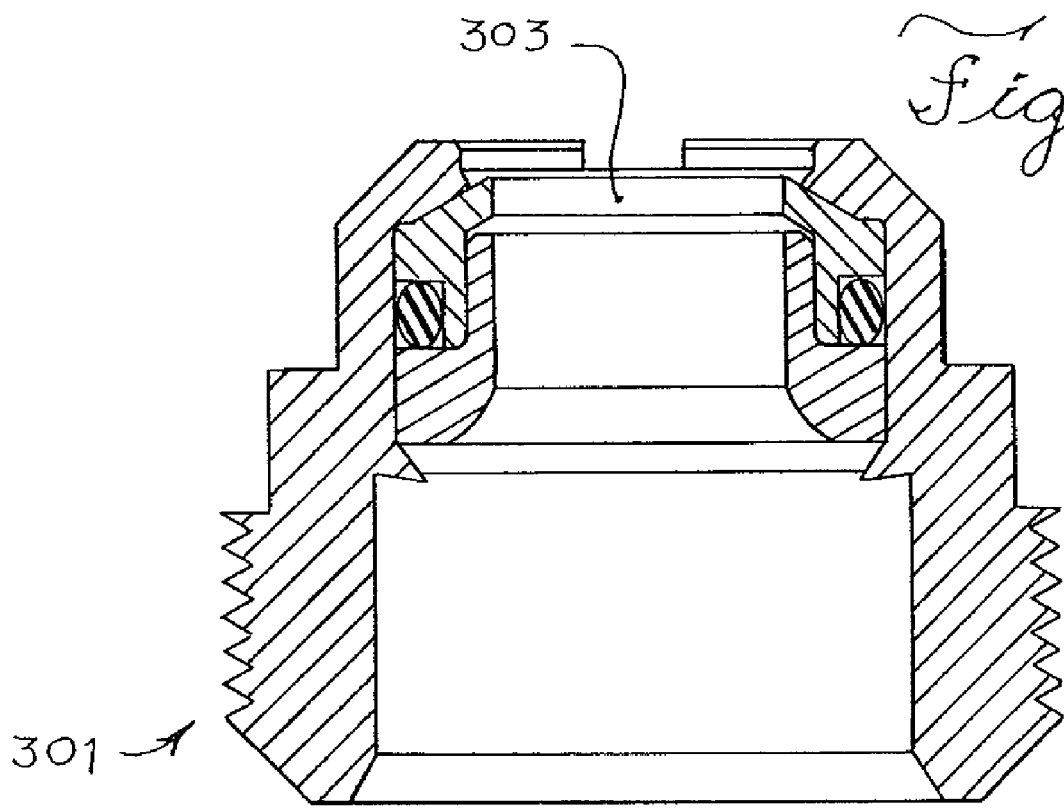

SAFETY RELIEF VALVE HAVING A LOW BLOW-DOWN VALUE AND SPRING THEREFORE

REFERENCE TO EARLIER FILED APPLICATIONS

The present application is a divisional of application Ser. No. 11/305,458, filed Dec. 16, 2005, now U.S. Pat. No. 7,337, 796, which is a divisional of application Ser. No. 10/601,304, filed Jun. 20, 2003, which is a continuation-in-part of U.S. patent application Ser. No. 10/364,290, filed Feb. 10, 2003, abandoned, all of which are hereby incorporated by reference in their entirely.

BACKGROUND

The present invention relates to safety relief valves for use on a pressurized system such as pressure vessel or a flow line, especially snap-type safety relief valves having a consistent low blow-down value, springs for safety relief valves and methods of manufacturing safety relief valves.

Spring operated relief valves are used to protect pressurized systems from pressures that exceed their maximum allowable working pressure or any pressures that the user specifies. Most spring operated relief valves use an externally adjustable coil springs that, when compressed, applies the force to keep the valve closed. The spring, which is externally adjustable by the means of a threaded adjustment screw, can be set to allow the valves to operate at a wide range of pressures. The pressure that an individual valve is set to open at is called the set pressure. When this set pressure is reached the valves opens and relieves the excess pressure. The valve then closes when the system pressure has dropped to a reduced level.

Snap-type safety relief valves have the advantage of responding very quickly to pressure changes in pressurized systems to which they are attached. Snap-type safety relief valves move to a fully open position almost immediately after the pressure within the pressure vessel rises above the user-determined set pressure. This allows excess gas pressure to escape quickly. Then, when sufficient pressure has escaped, snap-type safety relief valves quickly and crisply move back to a closed position. For an example of a snap-type safety relief valve, see U.S. Pat. No. 3,664,362, which is herein incorporated by reference in its entirety.

A "blow-down value" is the percentage difference between the user-determined set pressure and the pressure in the pressure vessel or flow line when the snap-type safety relief valve snaps closed. For example, if a user sets the set pressure at 100 psi, and valve stays open as gas escapes out of the snap-type safety relief valve until the pressure in the pressure vessel or flow line is 70 psi, then this snap-type safety relief valve has a blow-down value of 30%. For an example of a snap-type safety relief valve having a standard blow-down value, see U.S. Pat. No. 4,799,506, which is herein incorporated by reference in its entirety. Low blow-down valves have a blow-down value of about 15% or less, preferably about 10% or less. A particularly preferred valve will have a blow-down of 5% to 10% of set pressure. If the set pressure were, for example 100 psi, the reseat pressure would fall in the range of 90 psi to 95 psi for such a preferred valve. Low blow-down valves are desirable because they can minimize the amount of gas that is lost from the pressurized system into the atmosphere during venting, thereby addressing environmental concerns.

Existing low blow-down snap-type safety relief valves do, however, have some problems. One problem is that the blow-down values of the valves are affected by built-up downstream back pressures. The term "built-up downstream back pressures" is well understood in the art and documented in the American Petroleum Institute Recommended Practice 520. The length of outlet piping and the number of elbows that are attached to the outlet of the snap-type safety relief valves contributes to built-up downstream back pressures. Generally, the longer the outlet piping and the greater the number of elbows in the outlet piping, the more built-up downstream back pressure is are created.

Built-up downstream back pressures affect the blow-down value of typical snap-type safety relief valves. For example, a manufacturer may sell a snap-type safety relief valve with a blow-down value of 10% that is recommended to be used with 10 feet of outlet piping. At an installation site, the installer may disregard the manufacturer's recommendations and use 20 feet of outlet piping. In such a case, when the valve is in use, it will experience greater built-up downstream back pressures than the manufacturer designed for. The additional built-up downstream back pressures counteract forces that keep the valve open, and may cause the snap-type safety relief valve to close prematurely. If this occurs while the pressurized system still needs to vent, the snap-type safety relief valve would open again. The valve may then open and close in rapid succession, which is a phenomenon known as chatter. Chatter can shorten the life of a snap-type safety relief valve.

Another problem with existing low blow-down snap-type safety relief valves is that they tend to have a sliding-fit piston/sleeve design. See, for example, the snap-type safety relief valve described in U.S. Pat. No. 3,411,530, which is herein incorporated by reference in its entirety. In these designs, when the piston is raised so that gas may escape, a portion of the sleeve may obstruct the flow path as fluid flows through holes in the sleeve. As fluid escapes, foreign particles tend to accumulate between the sliding surfaces, causing additional friction between the sliding-fit parts. This build-up of foreign particles can cause freeze-up of the piston. This can affect the amount of pressure necessary to open the valve, and it can affect the blow down value of the valve, making the valve's performance less predictable. Also, contaminated gas can cause the valve to malfunction.

In addition to the above-mentioned problems, low blow-down snap-type safety relief valves can vary in quality in a number of ways. All snap-type safety relief valves each have a flow coefficient, which represents how unobstructed gas flows through the valve when it is fully open. Higher flow coefficients are considered to be better. Also, different snap-type safety relief valves vary in their ability to maintain their blow-down value, their performance reliability, their durability, their cost to manufacture, and their ease of use.

It is well known in relief valve art that for any given valve design, such as that disclosed in parent application Ser. No. 09/885,293, that as set pressures increase, the slope of the "Force-lift Curve" becomes steeper, i.e., the ratio of force to lift becomes larger. A detailed discussion of the "Force-lift Curve" is provided in U.S. Pat. No. 4,799,506, particularly in reference to FIG. 6 of that patent.

To obtain consistently low blow-downs over a broad range of set pressures for a given valve model, say 80 psi to 1500 psi, a series of springs, typically numbering from 15-20, is required.

A single spring in a relief valve will produce a range of operation for one size of valve, which is dependent on the rate of the spring. As the rate of the coil spring increases, the blow-down will also decrease. For a standard relief valve this range is quite large, achieving 20% blow-down at a set pressure and then 40% blow-down at some higher set pressure. In this type of valve line, the next higher pressure valve would be made with a higher rate spring that would achieve a blow-down of 20% at the same pressure that the previous valve produced a 40% blow-down. This is then repeated throughout the entire valve line so that when the individual valves are put together, they will cover a range of, for example, 15-2500 (psig). Because of standard spring rate tolerance these valves are designed with overlapping pressure ranges, which results in a slightly reduced operating range. This ensures that, even though springs rate tolerances drift, each valve will function properly over its intended operating range. Standard blow-down relief valves have very large spring ranges so that this overlap only necessitates the availability of a few sizes of springs in the inventory used to make the valves. Low blow-down valves, on the other hand, have operating ranges so short that any small over lap will greatly increase the number of springs needed for the valve line. In fact the overlap needed for a ±7% tolerance spring is so large that a 5%-10% blow-down valve line is not practical. A spring with a rate tolerance of ±5% would be about the maximum rate drift for this type of valve line. A rate tolerance of no greater than ±2%, ideally no greater than ±1%, would allow for a practical amount of springs in this line. This is an unrealistic tolerance due to spring manufacturing limitations and cost.

For example the following springs might be typical for a 0.788 in. diameter orifice safety relief valve, where increased wire sizes are used to keep the maximum allowable stress below an acceptable design limit. Lift values in ASME code-designed valves are constant over the set pressure range of any given orifice size.

| Set Point Range | Spring Rate | Wire Size |
| --- | --- | --- |
| 77.5-97.5 psi | 80 lbs/in. | .125 in. |
| 97.5-120 psi | 104 lbs/in. | .125 in. |
| 120-145 psi | 128 lbs/in. | .136 in. |
| 145-173 psi | 154 lbs/in. | .136 in. |
| 173-203 psi | 182 lbs/in. | .148 in. |
| 203-240 psi | 214 lbs/in. | .168 in. |
| 240-234 psi | 248 lbs/in. | .177 in. |
| 337-403 psi | 289 lbs/in. | .177 in. |
| 403-485 psi | 335 lbs/in. | .177 in. |
| 485-585 psi | 388 lbs/in. | .187 in. |
| 585-720 psi | 450 lbs/in. | .203 in. |
| 720-840 psi | 610 lbs/in. | .203 in. |
| 890-1120 psi | 714 lbs/in. | .225 in. |
| 1120-1420 psi | 838 lbs/in. | .225 in. |
| 1420-1840 psi | 990 lbs/in. | .250 in. |
| 1840-2420 psi | 1175 lbs/in. | .250 in. |

In order to insure that spring ranges do not over lap, and meet a specification of a 5% to 10% blow-down for each spring, very precise control of the rate of any given spring is required. Again refer to FIG. 6 of U.S. Pat. No. 4,799,506.

Helical or coil springs are one of the most common types of springs and are produced by the millions each year. Coil compression springs produce resistance to a compressive force that is applied through its central axis. These springs, when coiled with a constant diameter, produce a resistive force that is directly proportional to the spring's displacement. This property makes coil springs very predictable and easy to work with. The term rate, which is represented by R, describes the spring's ability to resist a given force. This can be shown mathematically by the equation: $R=F/D$ where F is force acting on the spring and D is the displacement due to that force. For springs that have a constant diameter and wire size, the rate is constant or linear, which mean that at any point of displacement the spring's rate stays the same. Constant rate coil springs are designed to a desired rate, which is dependent on four factors: wire size and modulus, the spring's mean diameter, and number of coils. Deviations and inconsistencies in these four factors make spring production not an exact science. Spring tolerance will vary form one spring manufacturer to another, but in general as design tolerances decrease so does the cost of producing the springs.

Most coil springs are wound on a highly efficiently machine that can produce standard springs very cheaply. For most spring manufactures, +10% deviations in spring rates is about average, and a rate around ±7% is considered about as tight as possible. Other types of coil spring manufacturing are available, such as springs that are machined for a blank. These machined springs can be produced to tighter tolerances than conventional springs, but are extremely expensive compared to wound coil springs. Because of this high rate tolerance, most spring applications have allowances for rate deviations, but in the safety relief valve industry, these deviations can be problematic for low blow-down valves. Spring operated relief valves are mass-produced with standard springs and, because of design allowances, work fine. Low blow-down relief valves with short spring ranges, on the other hand, need as tight of a spring rate tolerance as possible.

One approach to obtaining a rate tolerance of ±2% would be to test all springs from a good commercial spring vender, and discard those that have rates outside of the ±2% tolerance. This, of course, is very wasteful. In order to realize a 5% to 10% blow-down, as many as 40 different springs would have to be designed and purchased to cover the set pressure range for a given orifice size. The rate for each spring would then be recorded and sorted. To fill an order for any set pressure over the range of 80 psi to 1800 psi, a specific spring would then be selected with the rate required to produce a relief valve with a blow-down in the 5% to 10% range. While the procedure could be effective, it would be inefficient from a spring inventory and manufacturing perspective.

Thus there is a need for a way to modify springs for use in low blow-down valves so that they will have a rate within a ±2% tolerance. Also, a low blow-down valve design is needed to accommodate such modified springs.

SUMMARY OF THE INVENTION

A snap-type safety relief valve has been discovered that addresses the problems left unsolved by prior valves. Namely, it has been discovered that a snap-type safety relief valve having sonic flow into the body of the valve and out of a secondary orifice on the valve prevents built-up downstream back pressures from affecting the low blow-down value of the valve. This means that the addition of longer outlet piping on the valve, within limits, will not change the low blow-down value of the valve. Thus, the low blow-down value of the valve is consistent. If an excessive length of piping is added, however, then the flow out of the secondary orifice will no longer be sonic, and the blow-down value will be subject to built-up downstream back pressures. Nevertheless, so long as the flow into the body of the valve and out of the secondary orifice of the valve is sonic, built-up downstream back pressures are prevented from counteracting the forces keeping the valve open. The snap-type safety relief valve of the present invention preferably has a high flow co-efficient, and is easy and inexpensive to use and manufacture.

Also, it has been discovered that if spring rate tolerances are reduced from +7% to +2%, the number of different springs for a given valve design can be reduced from approximately 40 to 20. Furthermore, standard spring ranges can be established and documented to vastly improve the manufacturing process and also assist field servicing. Thus an improved safety relief valve using commercially available springs modified by various methods is also the subject of the present application.

In one aspect of the invention, a snap-type safety relief valve designed for use under specified operating conditions on a pressure vessel or a flow line having a pressurized gas therein is provided. The safety relief valve includes a body attachable to the pressure vessel or flow line, the body comprising a chamber therein and an inlet and an outlet, the inlet comprising an inlet valve seat, the outlet being adapted to attach to outlet piping. The safety relief valve also includes a disk member closable on the inlet valve seat. Further, the safety relief valve includes a mechanism in the body biasing the disk member to rest on the inlet valve seat with a set force such that when the pressure in the pressure vessel exceeds a set pressure resulting from the set force, the disk member is lifted from the inlet valve seat. The safety relief valve also includes a secondary orifice between the body chamber and the outlet, the secondary orifice being sized so that gas flows from the inlet valve seat into the chamber in a sonic flow and so that gas flows from the chamber through the secondary orifice in a sonic flow when the valve opens due to a pressure in the pressure vessel or flow line exceeding the set pressure during testing under the specified operating conditions.

In a second aspect, the invention is a safety relief valve comprising a body comprising a chamber therein and an inlet and an outlet, the inlet comprising an inlet valve seat; a disk member closable on the inlet valve seat; and a mechanism in the body biasing the disk member to rest on the inlet valve seat with a set force such that when the pressure in the inlet exceeds a set pressure resulting from the set force, the disk member is lifted from the inlet valve seat, the mechanism comprising a combination of a coil spring and one or more disk springs stacked in series with the coil spring.

In a third aspect, the invention is a method of manufacturing a group of safety relief valves each with a blow-down value of less than about 10%, the group covering a range of set pressures, the method comprising manufacturing multiple bodies, each having a chamber within the body, an inlet and an outlet, the inlet comprising an inlet valve seat; fitting a disk member within each of the bodies so as to be closeable on the inlet valve seat within the body; obtaining a plurality of coil springs to be used in the group of safety relief valves, each spring having an original spring rate, the original spring rates varying within the plurality of springs; measuring the original rate of each spring; and assembling the valve by placing a given spring within a given body so as to act with an adjustable force on the disk member, the given spring having its original spring rate modified prior to the final assembly of the valve.

In a fourth aspect, the invention is a method of preparing a coil spring for use in a pressure relief valve comprising measuring the spring rate of the coil spring and; modifying the spring so as to modify its spring rate to be within ±2% of a desired spring rate.

In a fifth aspect, the invention is an improved low blow down safety relief valve having an inlet, a disk member closable on the inlet, a mechanism biasing the disk member on the inlet, a body, and an outlet, the improvement comprising the mechanism comprising a spring having a modified spring rate.

In another aspect of the invention, a combination of outlet piping and a snap-type safety relief valve is provided. The combination includes a safety relief valve body attachable to the pressure vessel or flow line, the body comprising a valve body chamber therein and an inlet and an outlet, the inlet comprising an inlet chamber upstream of an inlet valve seat, the outlet being attached to the outlet piping, a portion of the outlet piping creating an outlet chamber proximal to the outlet. The combination also includes a disk member closable on the inlet valve seat and an adjustment screw acting on a spring in the body biasing the disk member to rest on the inlet valve seat with a set force such that when the pressure in the pressure vessel exceeds the set pressure resulting from the set force, the disk member is lifted from the inlet valve seat. The combination further includes a secondary orifice between the valve body chamber and the outlet, the secondary orifice being sized so that pressure in the valve body chamber is less than about 50% of the pressure in the inlet chamber and so that pressure in the outlet chamber is less than about 50% of the pressure in the valve body chamber, when the valve opens due to a pressure in the pressure vessel or flow line exceeding the set pressure during testing under the specified operating conditions.

In still another aspect of the invention, an improved low blow-down snap-type safety relief valve is provided. The valve has an inlet, a disk member closable on the inlet, a mechanism biasing the disk member on the inlet, a body, and an outlet. The valve prevents built-up downstream back pressures from changing a blow down value. The improvement on the valve comprises a secondary orifice in the body of the safety relief valve sized to permit gas to escape from the body through the secondary orifice in a sonic flow when the valve is opened during testing under operating conditions specified for the use of the valve.

In yet another aspect of the invention, a method of designing a low blow-down snap-type safety relief valve is provided. The method comprises (a) choosing a set of operating conditions under which the valve will ordinarily be run, including a set pressure; (b) providing a trial snap-type safety relief valve having: (i) a body attachable to the pressure vessel, the body comprising a chamber and an inlet and an outlet, the inlet comprising an inlet valve seat, the outlet being adapted to attach to the outlet piping; (ii) a disk member closable on the inlet valve seat; (iii) a mechanism in the body biasing the disk member to rest on the inlet valve seat with a set force such that when the pressure in the pressure vessel exceeds the set pressure resulting from the set force, the disk member is lifted from the inlet valve seat; and (iv) a secondary orifice between the chamber and the outlet, the secondary orifice having a first diameter; and (v) the snap-type safety relief valve having a first pressure gauge attached thereto, the snap-type safety relief valve being mounted on a pressure vessel, the pressure vessel having a second pressure gauge attached thereto; (c) causing the snap-type safety relief valve to snap open by increasing the pressure in the pressure vessel to exceed the set pressure; and (d) comparing a reading from the first pressure gauge to a reading from the second pressure gauge while the valve is open, (i) if the reading of the pressure of the first pressure gauge is from about 35% to about 50% of the pressure of the second pressure gauge, then the design process is complete; else (ii) if the reading of the pressure of the first pressure gauge is not from about 35% to about 50%, adjusting the diameter of the secondary orifice and repeating steps (c)-(d) until the reading of the first pressure gauge is from about 35% to about 50% of the reading of the second pressure gauge.

In still another aspect of the invention, a method of relieving pressure from a pressurized system is provided. In this method, a snap-type safety relief valve is connected in fluid communication with the pressurized system and the valve has (i) a body surrounding a chamber, (ii) an inlet with an inlet valve seat, (iii) a disk member closeable on the inlet valve seat, (iv) a mechanism biasing the disk member closed on the inlet valve seat, (v) an outlet attachable to outlet piping, and (vi) a secondary orifice between the chamber and the outlet. The method comprises exceeding a set pressure established for the valve, thereby lifting the disk member from the inlet valve seat. The method also comprises flowing gas from pressurized system through the inlet into the chamber in a sonic flow. The method also comprises flowing gas from the chamber through the secondary orifice into the outlet in a sonic flow.

The present invention provides the foregoing and other features, and the advantages of the invention will become further apparent from the following detailed description of the presently preferred embodiments, read in conjunction with the accompanying drawings. The detailed description and drawings are merely illustrative of the invention and do not limit the scope of the invention, which is defined by the appended claims and equivalents thereof.

BRIEF DESCRIPTION OF SEVERAL VIEWS OF THE DRAWINGS

FIG. 4 is cross-sectional view of a nozzle that can be used with any of the low blow-down snap-type safety relief valves of FIG. 1-3.

FIG. 5 is a top view of the nozzle of FIG. 4.

DETAILED DESCRIPTION OF THE DRAWINGS AND OF THE PREFERRED EMBODIMENTS OF THE INVENTION

"Pressure" as used herein generally refers to absolute pressure rather than gauge pressure, unless otherwise specified. Pressures measured relative to zero pressure (a vacuum) are absolute pressures. Absolute pressure is used in the perfect gas law. Pressures measured relative to atmospheric pressure are called gauge pressures. Absolute pressure (psia or pounds per square inch absolute) equals the measured gauge pressure (psig) plus atmospheric pressure.

Figure 1:
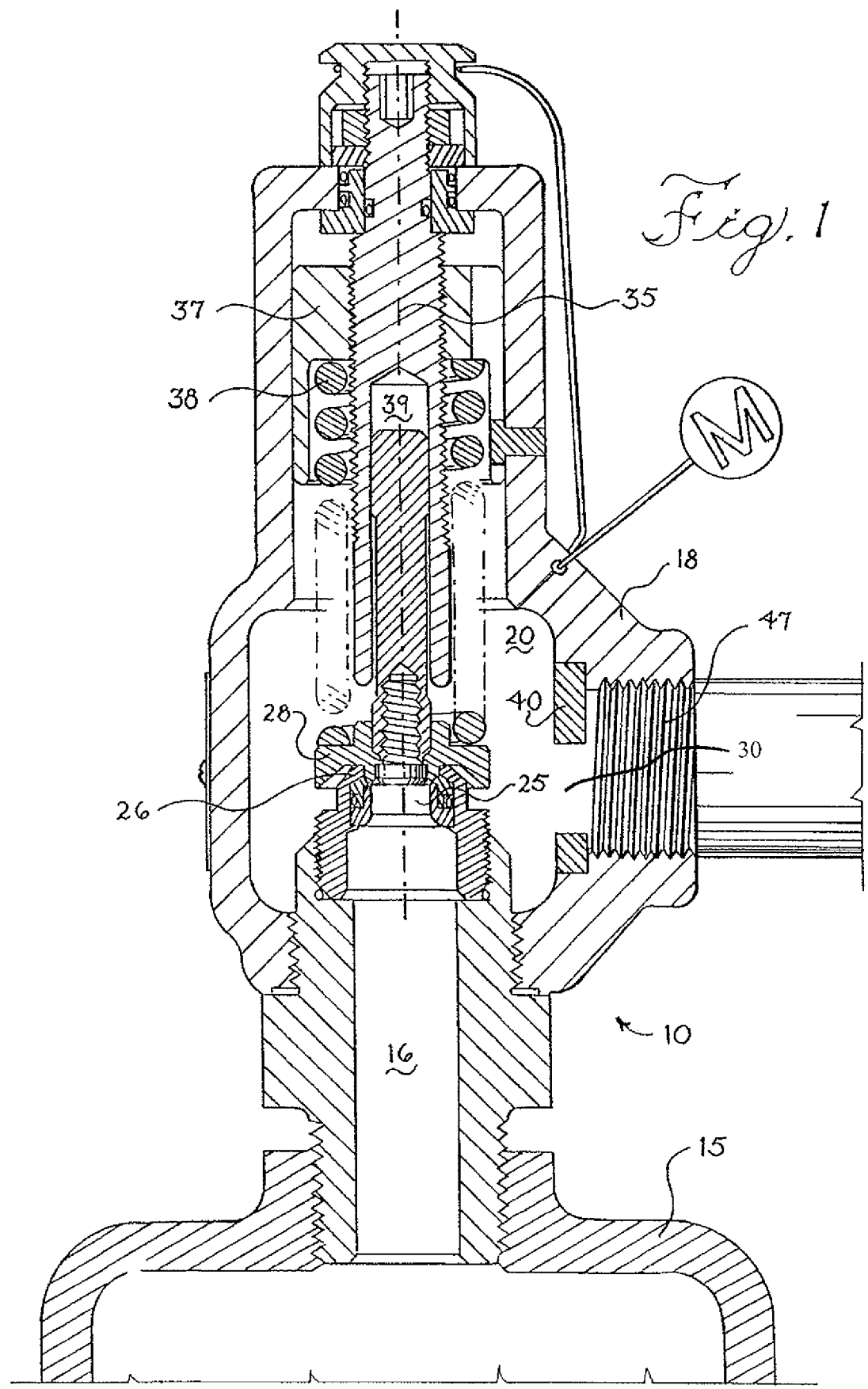
FIG. 1 is a cross-sectional view of a first preferred embodiment of a low blow-down snap-type safety relief valve in a closed position.

Referring to FIG. 1, a low blow-down snap-type safety relief valve 10 is shown in a closed position. The low blow-down snap-type safety relief valve 10 is removably affixed to a pressure vessel 15. Any method known in the art can be used to removably affix the snap-type safety relief valve 10 to the pressure vessel 15. Preferably, a threaded engagement is used. Nuts, bolts, screws, adhesives, and friction fitting may also be used.

The snap-type safety relief valve 10 has a body 18 defining a chamber 20 therein. Preferably, the body 18 is made of steel. Preferably, the steel that is used in the body 18 is one or more of commercially available mild steel, stainless steel, carbon steel, and combinations thereof. The material for a particular valve 10 may be selected based upon what the valve 10 will be used for, in particular, which gas will be flowing through valve 10.

In the closed position, disk member 28 removably rests upon the inlet valve seat 26 in the inlet nozzle 25. Preferably, the disk member 28 is made of steel. Preferably, the steel that is used in the disk member 28 is one or more of commercially available mild steel, stainless steel, carbon steel, and combinations thereof. Generally, the types of disk members 28 that are preferred require few sliding-fit parts, because sliding-fit parts and their assemblies are subject to high wear and tear. For example, the type of disk member 28 that is described in U.S. Pat. No. 4,799,506, which is herein incorporated by reference in its entirety, is a preferred disk member 28.

When the disk member 28 rests on inlet valve seat 26, gas cannot escape from the pressure vessel 15 through the inlet 16 and out of the inlet valve seat 26 into the chamber 20. The disk member 28 rests on inlet valve seat 26 in the closed position because a user has adjusted a mechanism to bias the disk member 28 to stay closed on inlet valve seat 26. Preferably, the mechanism is an adjustment screw 35, which acts, directly or indirectly, against a spring 38 to hold disk member 28 on inlet valve seat 26. For example, in FIG. 1, the adjustment screw 35 causes member 37 to directly act on spring 38.

The amount of force that the adjustment screw 35, member 37, and the spring 38 apply against the disk member 28 produces the set pressure. Although an adjustment screw 35 and a spring 38 are preferred, the set pressure can be adjusted using any mechanism known in the art.

Adjustment screw 35 is particularly preferred because it has a bore 39 therein. When the disk member 28 is removed from the inlet valve seat 26, the bore 39 provides a vertical path of movement for a stem on the disk member 28. Using this type of adjustment screw 35, the disk member 28 is guided up and down without any parts obstructing gas flow out of the snap-type safety relief valve 10, and without any undesirable lateral motion. This type of adjustment screw 35 is fully described in U.S. Pat. No. 4,799,506. Another benefit of this type of adjustment screw is that the adjustment screw provides an unchanging full open stop position for the valve member.

When the pressure inside the pressure vessel 15 exceeds the set pressure, snap-type safety relief valve 10 opens. Specifically, the gas comes through the inlet 16 through the inlet nozzle 25 and applies an upward force to the disk member 28. When the upward force exceeds the down forces acting on disk member 28, including the set pressure, the disk member 28 is lifted from the inlet valve seat 26 and guided upward. Note that the upward/downward language is used to describe the orientation of preferred embodiment of the valve 10 shown in FIG. 1. The snap-type safety relief valve 10 could be designed so that the disk member 28 moved horizontally rather than vertically, or in another direction.

When the disk member 28 is lifted from the inlet valve seat 26, gas escapes from the inlet nozzle 25 into the chamber 20. The gas escapes into the chamber 20 at sonic flow, which is the fastest that the gas can escape into valves made with a standard nozzle. The pressure in the chamber 20 is less than about 50% of the pressure in the inlet chamber 16. Even if the pressure in chamber 20 is much less than about 50% of the pressure in the pressure vessel or flow line (say, 30%), the pressure drop from the inlet chamber 16 to the throat of the inlet nozzle 25 will stay at about 50%.

The term "about 50%" is used because the critical pressure ratio for most gases used is fairly close to 50%. For example, the critical pressure ratios for air, nitrogen, and oxygen are all 52.8%, the critical pressure ratio for natural gas is 55.1%, and the critical pressure ratio for propane is 57.6%. Thus, one of skill in the art should understand that the term "about 50%" is meant to reflect the critical pressure ratio for the gas used in a particular installation of a snap-type safety relief valve 10.

Next the gas must flow from the chamber 20 out of the secondary orifice 30, which lies in the orifice plate 40, out of the outlet and into the outlet piping 50. Flow out of the secondary orifice will be sonic when the valve is fully open under specified operating conditions, which will prevent built-up downstream back pressures from causing the valve to close prematurely. This means that the portion of the outlet piping 50 that is proximal to the secondary orifice 30, an outlet chamber 47, must have a pressure therein that is less than about 50% of the pressure in the chamber 20.

The orifice plate 40 is preferably made of steel. In steel embodiments, the orifice plate 40 is preferably stainless steel. The orifice plate 40 can be attached to the body 18 of the snap-type safety relief valve 10 using any mechanism known in the art, including friction fitting, nuts, bolts, screws, and the application of adhesive substances.

In FIG. 1, without the orifice plate 40, the gas would flow out of the outlet in a subsonic manner, making the snap-type safety relief valve 10 susceptible to built-up downstream back pressures caused by the length and shape of the outlet piping 50.

By adding the orifice plate 40 to the body 18, the area of the secondary orifice 30 through which the gas can flow has been reduced. The area of the secondary orifice 30 should be chosen to create conditions that will allow sonic flow out of the secondary orifice 30.

The desired area of secondary orifice 30 depends on the specified operating conditions for a particular installation of the snap-type safety relief valve 10. Such specified operating conditions include but are not limited to the media (the gas) being relieved through the valve 10, the temperature at which the valve 10 is run, the maximum pressure of the pressure vessel or flow line to which the valve 10 will be attached (which will be related to the set pressure), the size of the inlet and the outlet of the valve 10, the material comprising the trim of the inlet nozzle 25, the maximum flow capacity of the valve 10, the length and number of elbows of the outlet piping 50 attached to the valve 10, etc. Those of ordinary skill in the art understand the various specified operating conditions for a particular valve 10.

For example, a gas used in a typical installation might be air, natural gas, carbon dioxide, propane, or another gas. Temperature during operation of the valve 10 may be 100 degrees F. at the inlet nozzle 25 of the valve 10 and 70 degrees F. at the secondary orifice 30. A typical set pressure might be 100 psig, and the typical outlet piping 50 might be 2-inch schedule 80 piping that is 20 feet long and has one elbow.

For a particular installation, certain operating conditions may involve ranges. For example, a valve may be specified to operate at any temperature within a range of temperatures. Often, the manufacturer of a valve will specify ranges of operating conditions for which their valves are designed. For purposes of determining the specified operating conditions for the purposes of interpreting the attached claims, tests should be run at the midpoint of any such ranges.

Because the specified operating conditions vary for different installations, the desired area of secondary orifice 30 for a particular installation must be determined by one of skill in the art through routine experimentation given the specified operating conditions. An example is provided hereafter to assist one of skill in the art in determining the area of the secondary orifice 30 in the valve 10.

When the ideal area for secondary orifice 30 is determined and implemented in a valve 10, gas flows from the chamber 20 through the secondary orifice 30 in a sonic flow when the valve is open and running under specified operating conditions and there is at least 30 psia of pressure in the chamber 20. The sonic flow through the secondary orifice 30 prevents built-up downstream back pressures caused by the length and shape of the outlet piping 50 from affecting the blow-down value of the valve 10. Thus, the snap-type safety relief valve 10 may maintain its blow-down value better, chatter less, and last longer.

It is preferred that outlet piping 50 be less than 20 feet. It is also preferred that outlet piping 50 have 0,1, or 2 elbows. Through routine experimentation, one of skill in the art can determine at what length and with how many elbows that the outlet piping 50 begins to affect the blow-down value of the snap-type safety relief valve 10 by preventing the flow out of the secondary orifice from being sonic.

The American Society of Mechanical Engineers Boiler and Pressure Vessel Code recommends that built-up downstream back pressures (such as those caused by outlet piping 50) for standard spring-operated valves does not exceed 10% of the set pressure at the outlet chamber 47.

Figure 2:
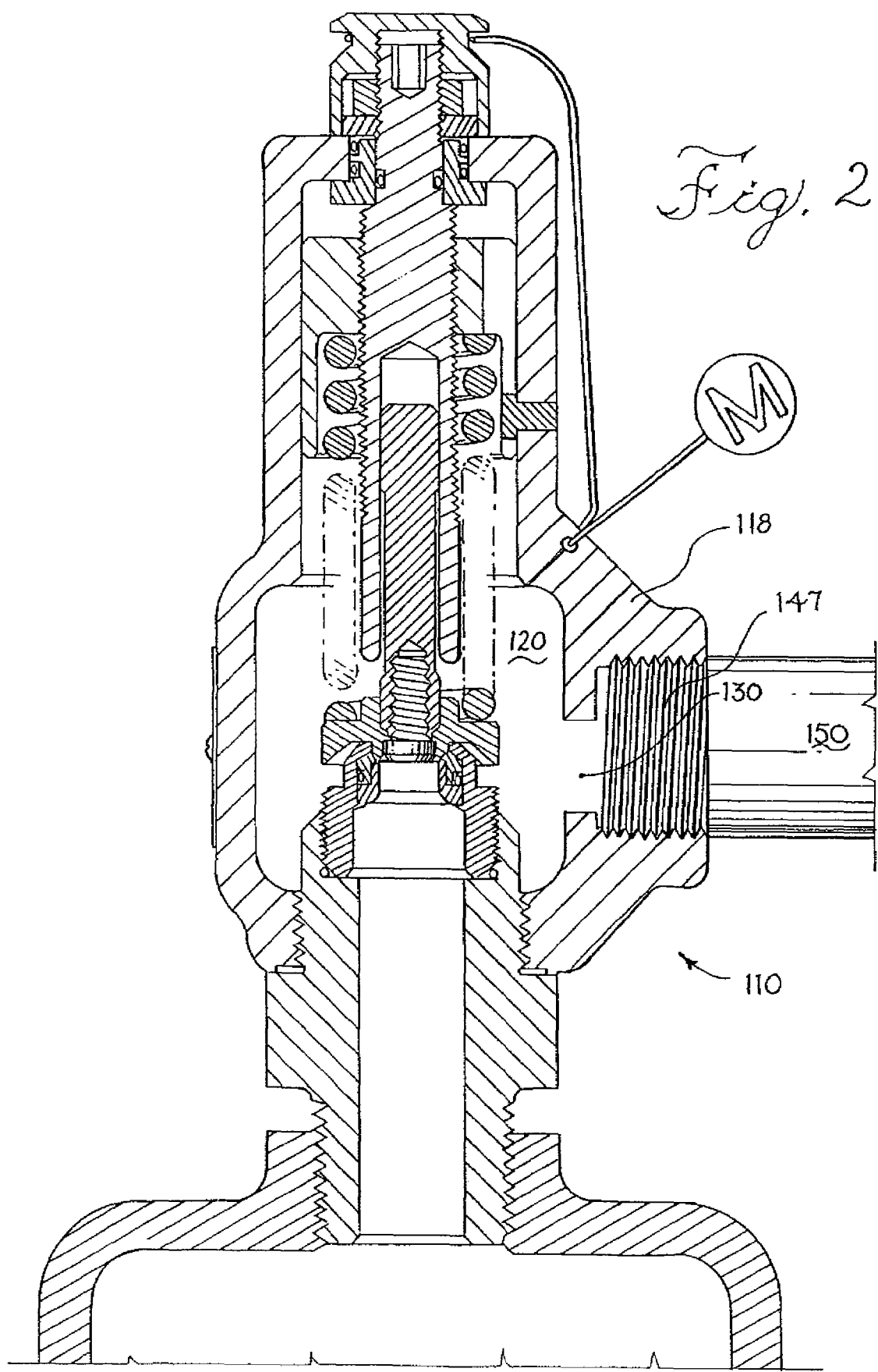
FIG. 2 is cross-sectional view of a second preferred embodiment of a low blow-down snap-type safety relief valve in a closed position.

Referring to FIG. 2, another preferred embodiment of a snap-type safety relief valve 110 is shown. Valve 110 is substantially identical to valve 10. The only difference is that valve 110 does not have an orifice plate 40. Instead, the body 118 of valve 110 is shaped to provide the function of creating the area of secondary orifice 130 through which gas flows in a sonic manner. The body 118 can be so shaped during its manufacture. The particular dimensions of the secondary orifice 130 depend upon the particular specified operating conditions of the installation, and must be determined by one of skill in the art through routine experimentation.

Importantly, the secondary orifice 130 should be sized so that the pressure in the outlet chamber 147 is less than about 50% of the pressure inside the chamber 120 when the valve 110 is opened due to a pressure exceeding the set pressure, and the valve 110 is running under specified operating conditions, and there is at least 30 psia of pressure in the chamber 120. This ensures sonic flow through the secondary orifice 130, preventing built-up downstream back pressures from affecting the blow-down value of the valve 110.

Figure 3:
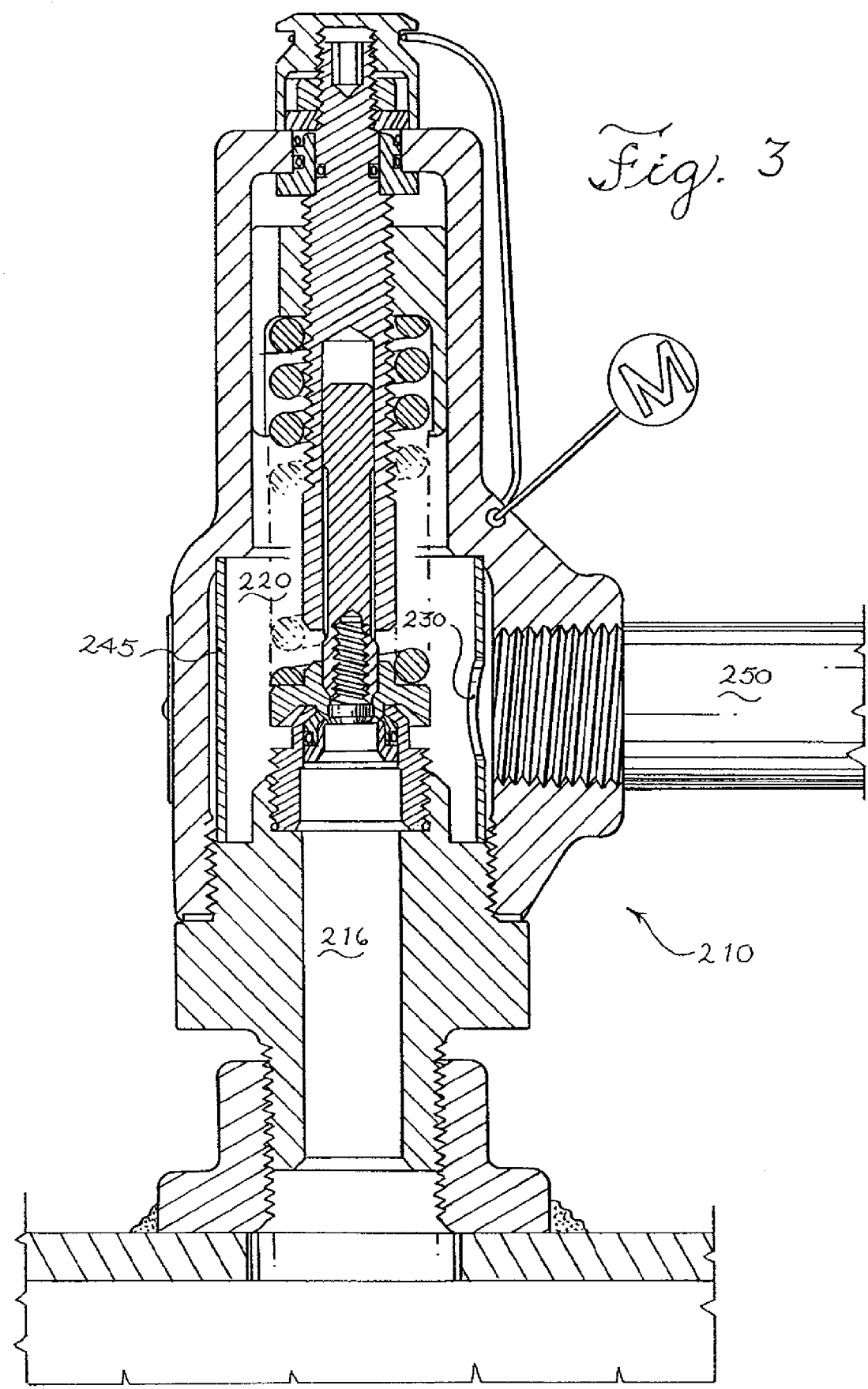
FIG. 3 cross-sectional view of a third preferred embodiment of an embodiment of a low blow-down snap-type in a closed position.

Referring to FIG. 3, another preferred embodiment of a snap-type safety relief valve 210 is shown. Valve 210 is substantially identical to valve 10, except that the valve 210 has a chamber 220 into which a hollow cylinder 245 has been inserted. The volume inside the hollow cylinder 245 serves as part of the wall of the chamber 220 in valve 210. That is, to achieve sonic flow from the inlet chamber 216 into the hollow cylinder 245, the pressure inside the hollow cylinder 245 must be less than about 50% of the pressure in the inlet chamber 216.

Also in FIG. 3, a sidewall of the hollow cylinder 245 has a secondary orifice 230 defined therein. Gas must escape through secondary orifice 230 before entering the outlet piping 250. The particular dimensions of the secondary orifice 230 depend on the specified operating conditions for a particular installation of the snap-type safety relief valve 210, and must be determined by one of skill in the art through routine experimentation.

Importantly, the secondary orifice 230 should be sized so that the pressure in the outlet chamber 247 is less than about 50% of the pressure inside the chamber 220 when the valve 210 is opened due to a pressure exceeding the set pressure, and the valve 210 is running under specified operating conditions, and there is at least 30 psia of pressure in the chamber 220. This ensures sonic flow through the secondary orifice 230, preventing built-up downstream back pressures from affecting the blow-down value of the valve 210.

Referring to FIGS. 4 and 5, a preferred inlet nozzle 301 is shown. FIG. 4 shows a cross-sectional view of the inlet nozzle 301, and FIG. 5 is a top view of the same. The inlet nozzle 301 can be used with any low blow-down snap-type relief valve. The inlet nozzle has as huddling chamber 303. Huddling chambers are described in U.S. Pat. Nos. 4,446,886; 4,566,486; 4,799,506; and 4,932,434; which are herein incorporated by reference in their entirety.

Basically, a huddling chamber is a region in an inlet nozzle that causes a preferred snap-type safety relief valve to snap open. If a huddling chamber is too large, it can cause a blow-down value of a snap-type safety relief valve to be higher than desired. Thus, it may be desirable to modify a huddling chamber so that the valve still snaps open, but the valve keeps a low blow down value.

Such modifications can be done by several methods that would be understood by one of skill in the art. For example, in FIG. 5, slots 305 were milled into the nozzle 301 to temper the effect of the huddling chamber 303. This way, some gas escapes through slots 305 rather than acting against the disk member.

PROPHETIC EXAMPLE 1

Determining the Size of a Secondary Orifice

Figure 6:
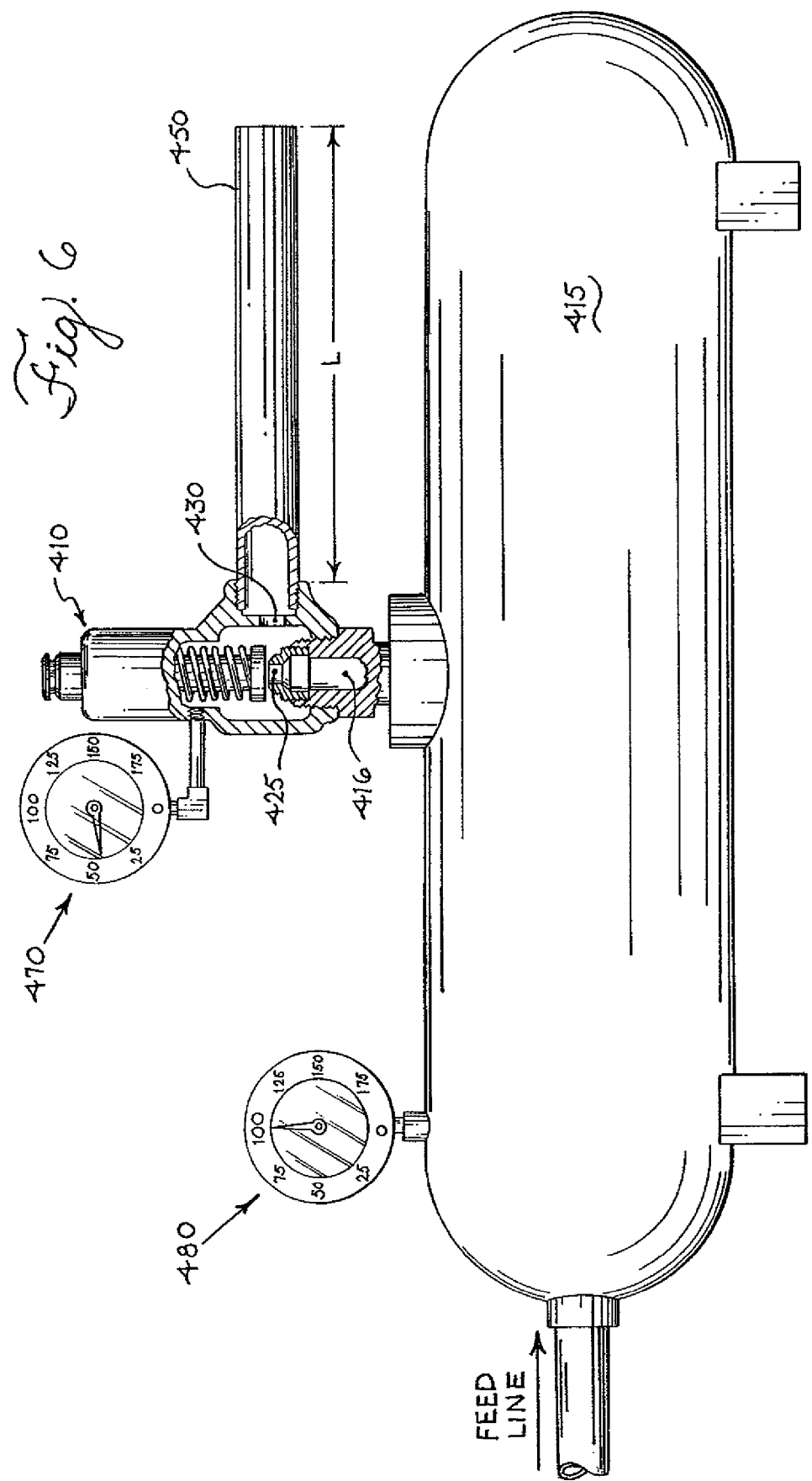
FIG. 6 is a schematic view of a preferred embodiment of a low blow-down snap-type safety relief valve mounted on a pressure vessel.

Referring to FIG. 6, a non-limiting example is provided to show a preferred method for experimentally determining what size to make a secondary orifice 430 in a trial snap-type low blow-down safety relief valve 410.

The trial snap-type low blow-down safety relief valve 410 is designed for specified operating conditions. For example, the trial snap-type low blow-down safety relief valve 410 may be designed to operate with a maximum length of from about 15 feet to about 20 feet of outlet piping 450 having one elbow (not shown). The outlet piping 450 is of the type with schedule number 80, since this is the most common seamless pipe for the pressure ranges addressed in this non-limiting example. The trial snap-type low blow-down safety relief valve 410 may also be designed for a set pressure of 100 psia that will relieve air from a pressurized system when the pressures therein exceed the set pressure. In a typical scenario, the air would flow into the valve 410 at 100 degrees F. and flow out of the valve 410 at 70 degrees F.

A trial snap-type low blow-down safety relief valve 410 having outlet piping 450 is mounted on a pressure vessel 415. The pressure in the pressure vessel 415 is reported by a vessel pressure gauge 480. The pressure in the trial snap-type low blow-down safety relief valve 410 is reported by a body pressure gauge 470. Both gauges are set to read pressure in psia.

The pressure in the pressure vessel 415 is increased until the trial snap-type low blow-down safety relief valve 410 snaps open. After the snap-type low blow-down safety relief valve 410 is fully open, the pressure reading on the vessel pressure gauge 480 should be compared to the pressure reading on the body pressure gauge 470.

As long as the pressure reading on the body pressure gauge 470 is less than about 50% of the pressure reading on the vessel pressure gauge 480, gas will flow sonically from the inlet nozzle 425 into the body of the trial snap-type low blow-down safety relief valve 410. Preferably, the pressure reading on the body pressure gauge 470 is from about 35% to about 50% of the pressure reading on the vessel pressure gauge 480. It is preferred that while the valve 410 is fully open, the pressure in the body should not drop below 30 psia.

This permits sonic flow of gas from the pressure vessel into the body of the trial snap-type low blow-down safety relief valve 410. This also permits sonic flow from the body of the trial snap-type low blow-down safety relief valve 410 out of the secondary orifice 430 so long as the back pressure due to the length and number of elbows in the outlet piping 450 are less than about 50% of the pressure reading on the body pressure gauge 470 and there is at least about 30 psia of pressure in the body of valve 410. Then, gas escapes through the outlet piping 450 and out to the atmosphere.

If the difference in the pressure readings falls within the 35 to 50% range, no adjustment need be made to the size of the secondary orifice 430 on the trial snap-type low blow-down safety relief valve 410.

If the reading of the body pressure gauge 470 exceeds 50% of the reading of the vessel pressure gauge 480, the size of the secondary orifice 430 should be enlarged, and the trial process repeated until the difference in the pressure readings falls within the preferred range. Otherwise, subsonic flow will occur at the inlet nozzle 425.

If the reading of the body pressure gauge 470 is less than 35% of the reading of the vessel pressure gauge 480, the size of the secondary orifice 430 should be reduced, and the process repeated until the pressure readings falls within the preferred range. Otherwise, the length of outlet piping 450 that the relief valve 410 can withstand without a change in blow-down value will be reduced.

When the critical pressure ratio of the gas being used in the system is read on the body pressure gauge, then the valve designer will know that the secondary orifice 430 is the smallest size possible without restricting the flow at the inlet nozzle 425.

Also, the outlet piping 450 can be changed with other, longer outlet piping and/or outlet piping having more elbows, so long as the additional length and/or elbows do not cause the pressure just outside the secondary orifice 430 to become greater than about 50% of the pressure reading on the body pressure gauge 470. However, if too much outlet piping 450 is added, the flow out of the secondary orifice 430 will not be sonic and the blow down value of the valve 410 will be affected.

In conjunction with the foregoing design for a low blow-down valve, a method of manufacturing such valves has also been invented. As noted above, in order to manufacture a series of valves having the designed range of set rates, a solution to the problem of spring rate variability was needed. First, a different type of spring arrangement was conceived of. Second, to use low cost coil springs, and rather than discarding coil springs outside of a small tolerance from the desired spring rate, ways of modifying the spring rate were developed.

Figure 7:
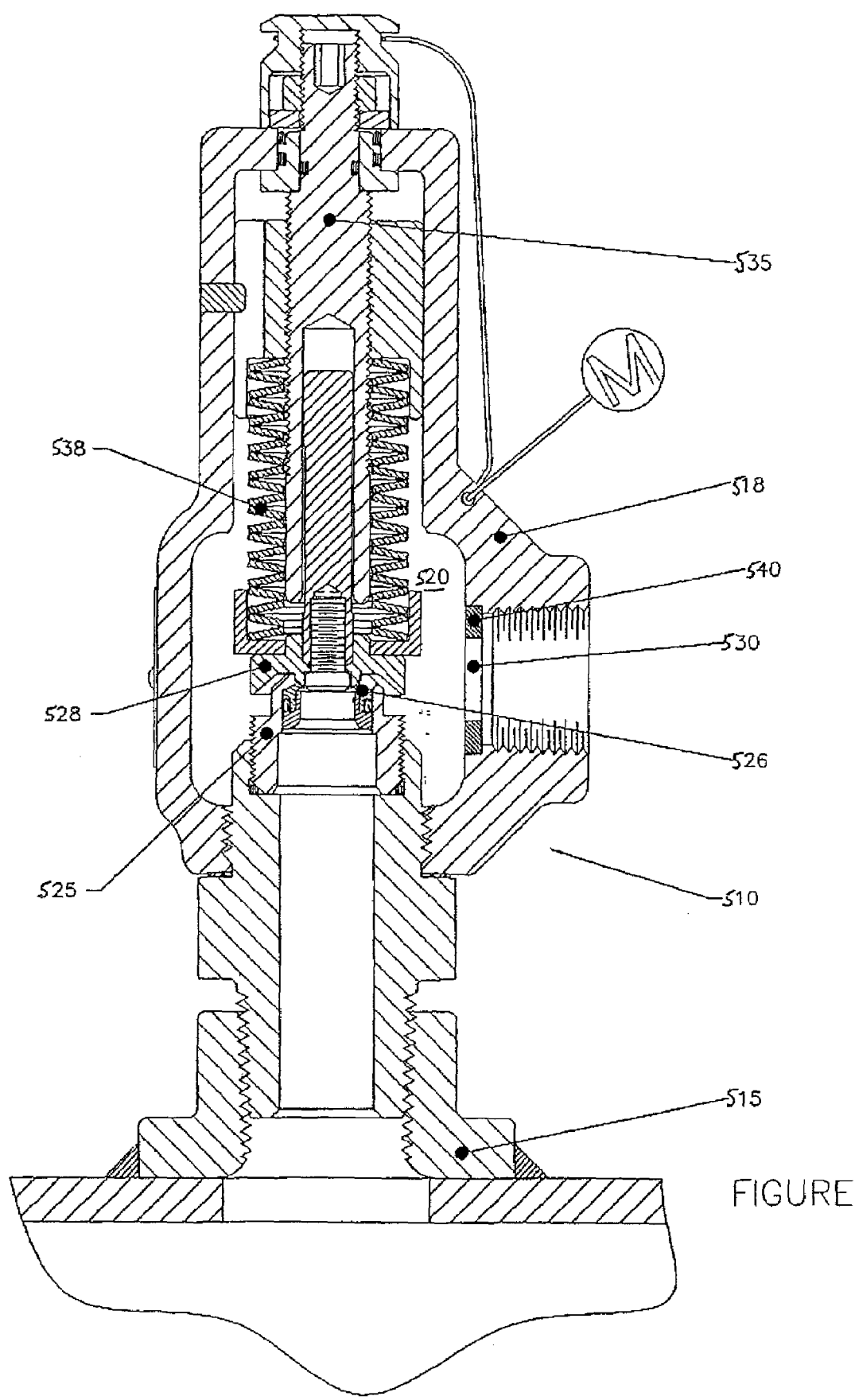
FIG. 7 is a cross-sectional view of a fourth preferred embodiment of a low blow-down snap-type safety relief valve in a closed position, depicting the use of Belleville washers to produce a reduced tolerance on the rate of the set spring.

One method for constructing a set point spring to a close rate tolerance is to use a different type of spring arrangement, such as a conical shaped washer with a hollow center, as shown in FIG. 7. In this embodiment, a stack of disc springs, particularly Belleville spring washers 538, is used to build a low rate tolerance set point spring. Belleville washers are available in a wide variety of diameters and material thicknesses. These washers may be stacked in series as shown whereby the overall stack spring rate is diminished as the number of disks is increased. Reducing the thickness of each disk also reduces the spring rate.

By selection of the diameters and thickness and the number in the stack, a very close spring tolerance can be obtained. Some disadvantages of this approach are hysteresis in the spring stack due to friction, costs, and the large inventory of thicknesses required to reach a desired spring rate. Thus, while workable, other approaches, such as modifying the spring rate, are more desirable.

One method of modification of a spring rate, sometimes used in pneumatic instruments, is by making a plug member with an internal spiral groove. The spiral groove is designed with a pitch roughly equal to the pitch of a wound coil spring with one end not "closed and ground." The coil spring is then designed to have a rate less than that desired. Since the rate of a coiled spring follows the following formula:

$$\text{Rate } R = \frac{Gd}{8nD}$$

Where G=Modules in Torsion
d=Wire outside diameter
n=No. of active coils
D=Mean diameter of coils.

Figure 8:
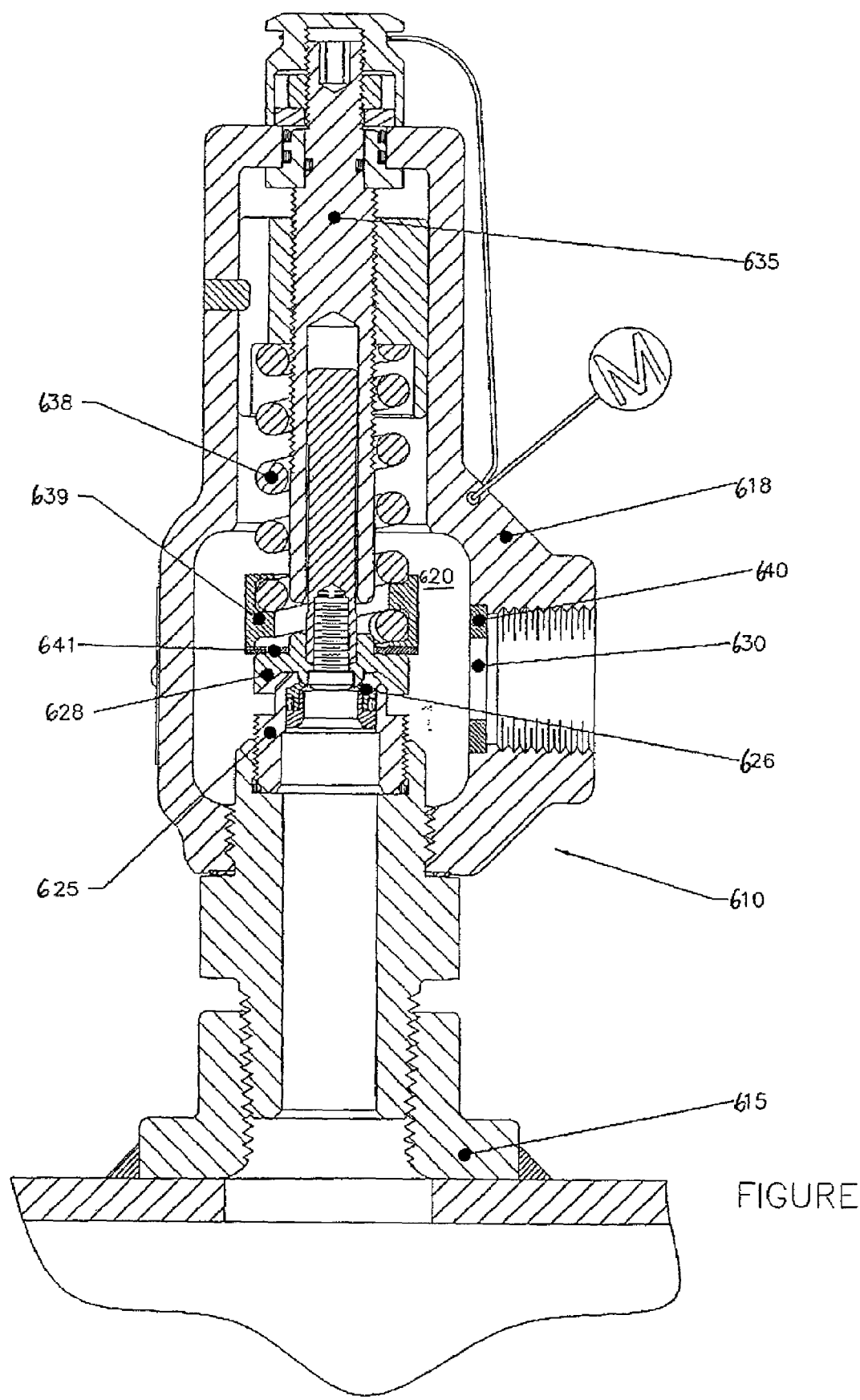
FIG. 8 is a cross-sectional view of a fifth preferred embodiment of a low blow-down snap-type safety relief valve in a closed position, depicting an internal spiral cylinder that is used to short out coils and increase the rate of a coiled spring.

The spiral plug is then adjusted into the spring to short out a number of active coils, which increases the spring rate. By varying the insertion depth of the plug, the rate of the spring can be adjusted from a low design value to the desired value to give the required 5% to 10% blow-down. One disadvantage of the system is the extremely close tolerance of the internal groove. This arrangement is shown in FIG. 8, which illustrates the use of a standard machine wound coil spring with on end "as wound" i.e. not closed and ground square. A hollow cylindrical member 639 with an internal spiral groove is threaded over the lower end, effectively shorting out one or more coils of the coil spring. The lower face of the cylindrical member rests on washer 641, which in turn rests on the upper face of disk 628. Threading the cylindrical member 639 onto the spring in varying degrees effectively adjusts the number of active coils in the coil spring, which then effectively adjusts the rate of the spring. By this method, the tolerance on spring rates can be reduced from a standard ±7% to a tighter value of ±2%.

Figure 9:
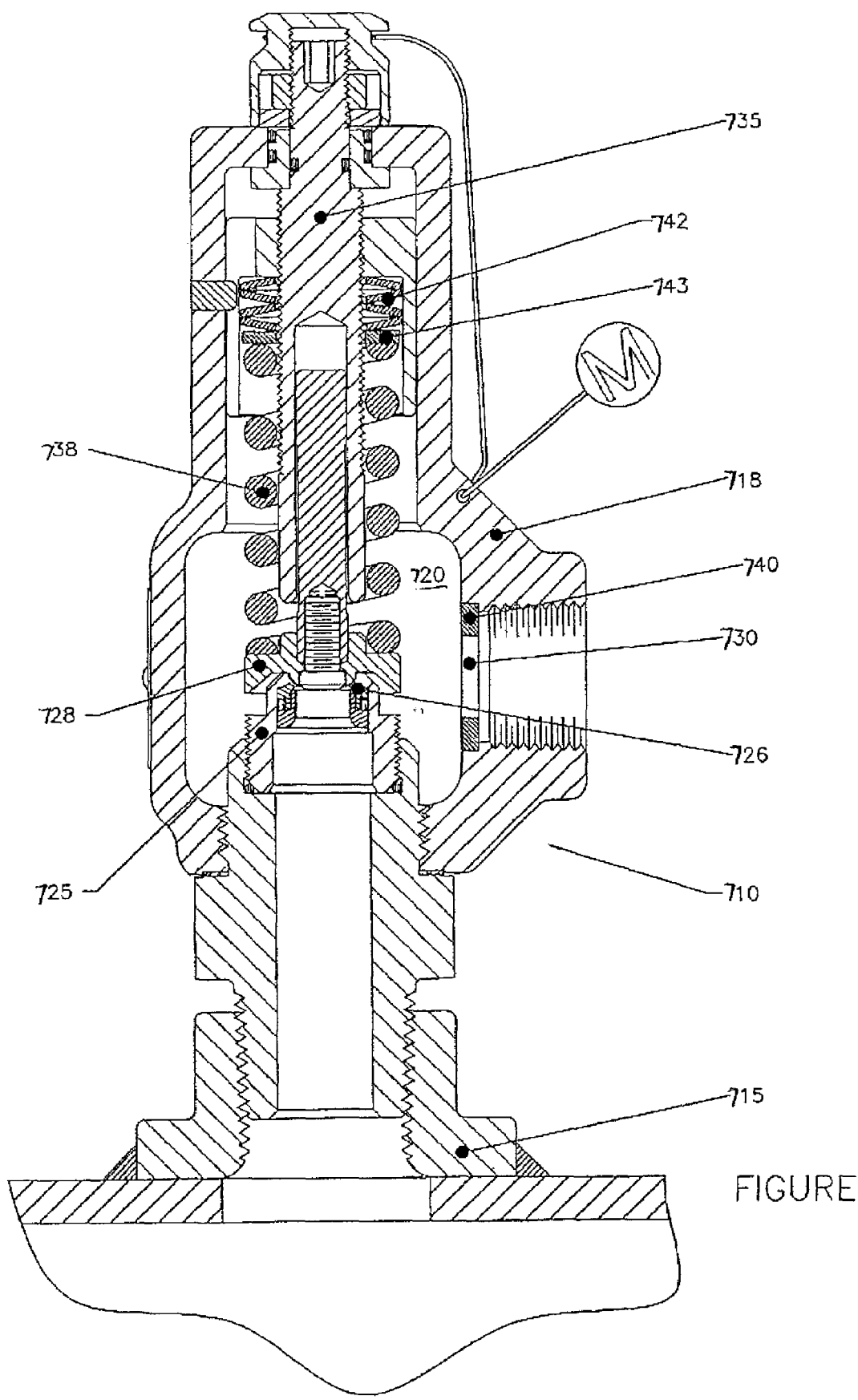
FIG. 9 is a cross-sectional view of a sixth preferred embodiment of a low blow-down snap-type safety relief valve in a closed position, depicting a basic coil spring modified by the addition of a series of Belleville washers to reduce the overall spring rate tolerance from +7% to +2%.
Figure 9A:
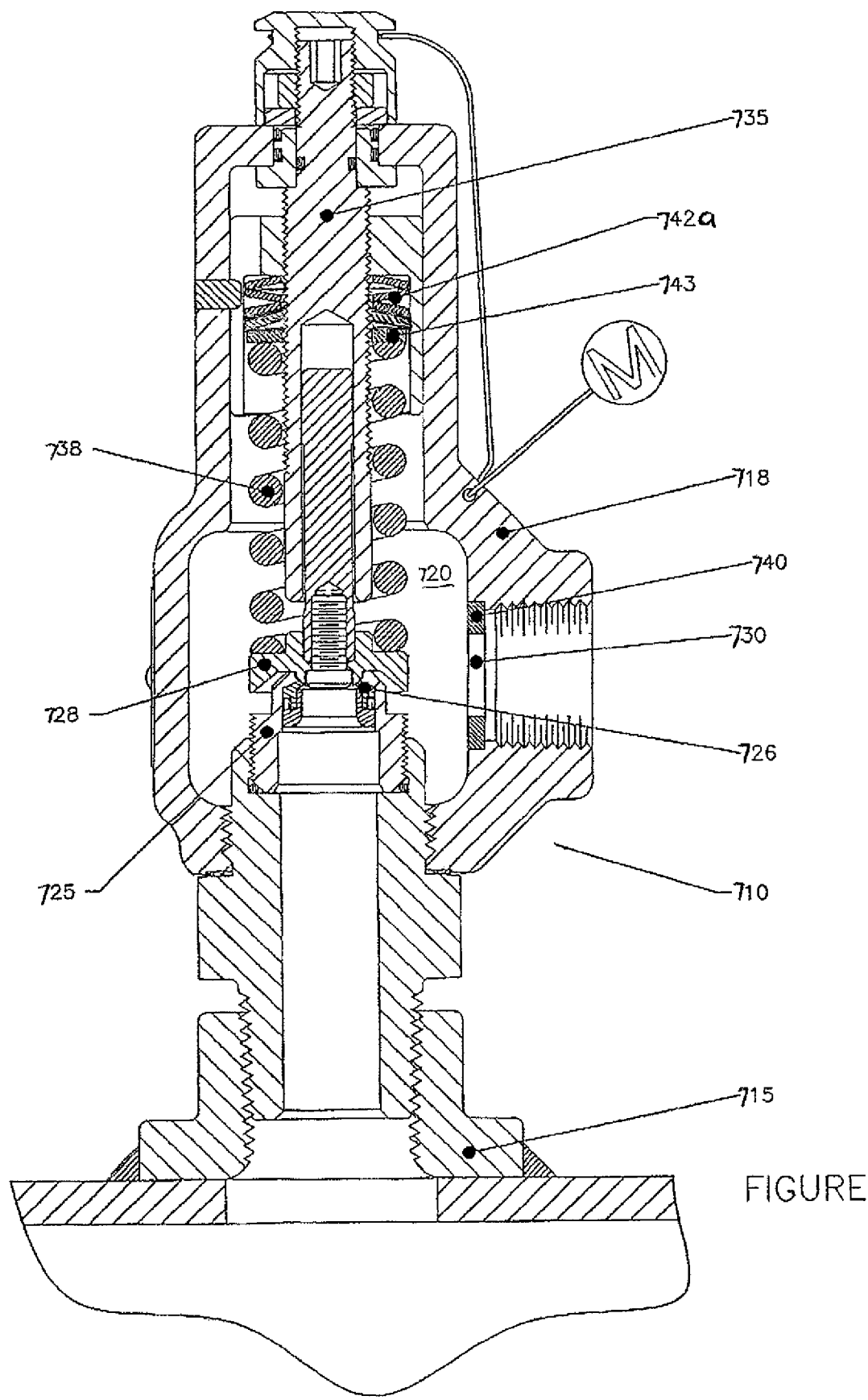
FIG. 9a is a cross-sectional view of an alternative to the embodiment of FIG. 9 in which two of the Belleville washers are stacked in parallel.
Figure 10:
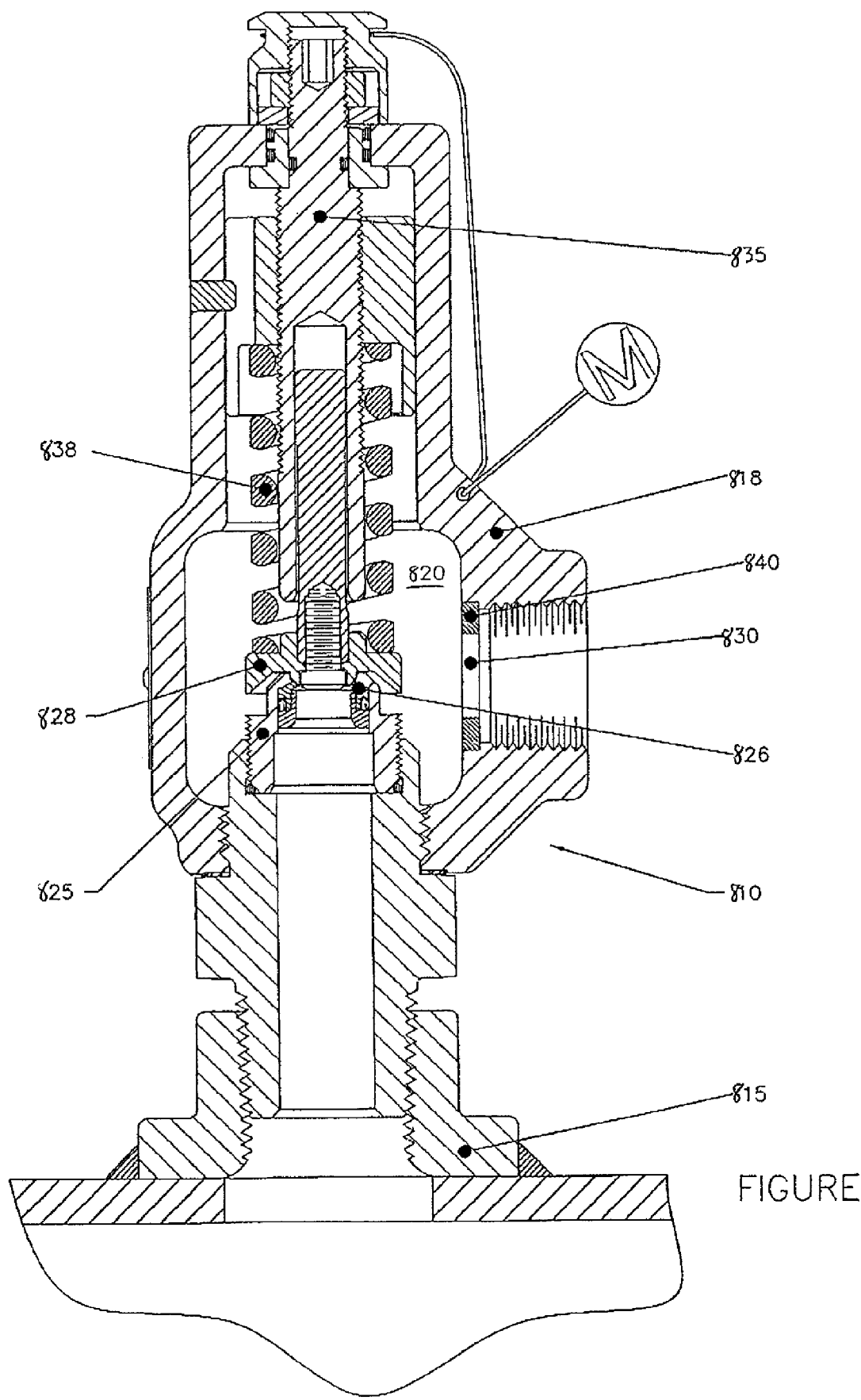
FIG. 10 is a cross-sectional view of a seventh preferred embodiment of a low blow-down snap-type safety relief valve in a closed position, depicting a basic coil spring modified by the reduction of the spring outside diameter to reduce the rate tolerance from +7% to +2%.
Figure 11:
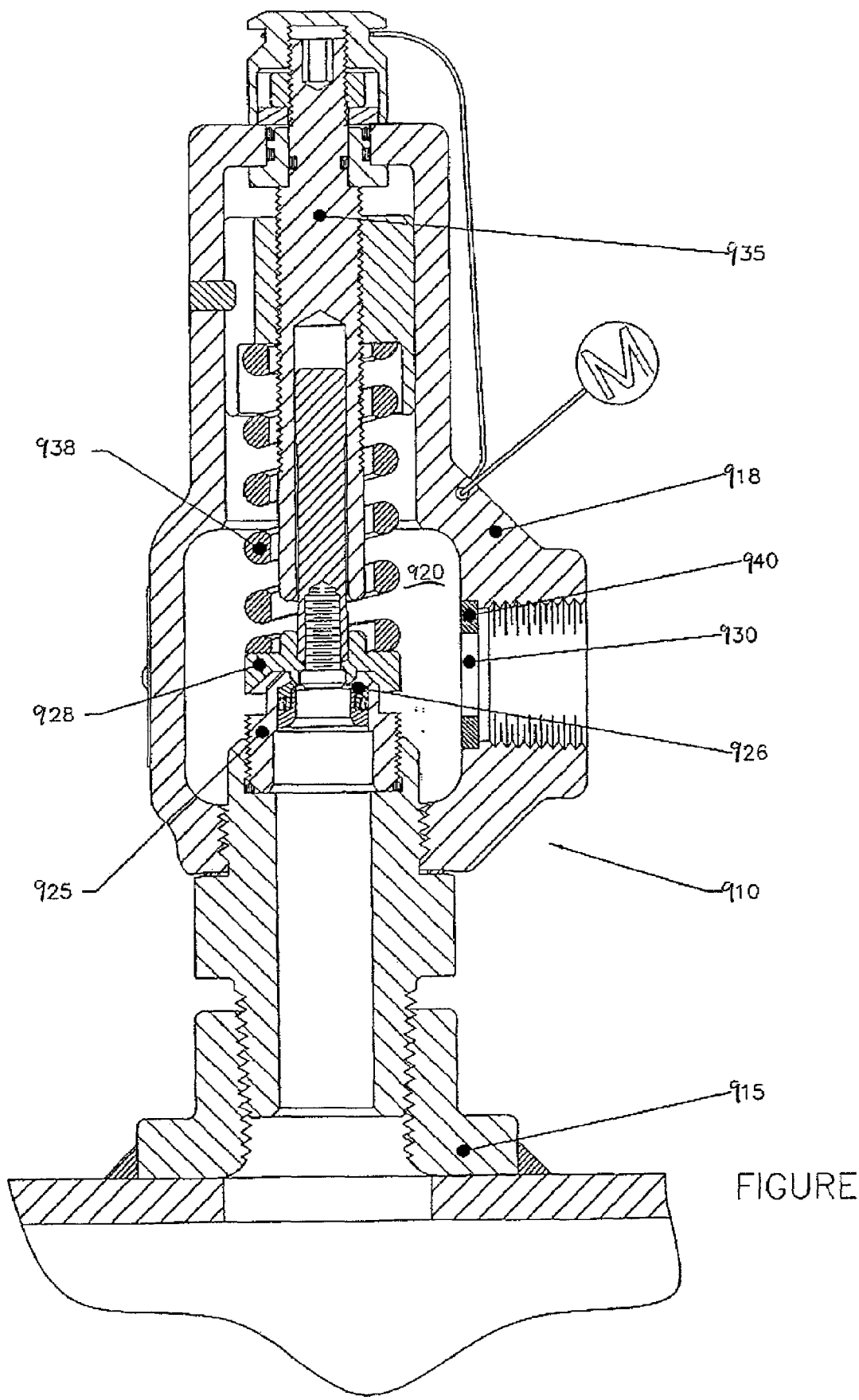
FIG. 11 is a cross-sectional view of an eighth preferred embodiment of a low blow-down snap-type safety relief valve in a closed position, depicting a basic coil spring modified by enlargement of the spring inside diameter to reduce the rate tolerance from +7% to +2%.

Four new designs for spring rate modification have been invented which are particularly preferred. These methods are shown in FIGS. 9 through 11. These four designs are based on the use of a standard wound coil spring having a rate tolerance of +7% which is then modified to reduce the rate tolerance to +2%. The +2% rate tolerance is required to achieve the previously stated advantages FIG. 9 illustrates another preferred embodiment of the invention which utilizes a standard wire wound spring 738. A washer 743 is stacked on the end of spring 743 and engages a short stack of Belleville washers 742, which are arranged as shown. FIG. 9*a* shows an alternate embodiment, described below, in which the Belleville washers 742*a* are stacked slightly differently. Belleville washers effectively reduce the rate tolerance of +7%, which would be the case if no Belleville washers were used, to a rate tolerance of +2%. The following discussion will illustrate the design of this method.

This design involves using standard coil spring and adjusting them with disk springs. This allows a spring that has a high rate to be adjusted down to a desired lower rate. If the rate is within a small percentage of its total rate, such as +7%, then only a few disk springs are needed to do this.

To understand how these embodiments work, a better understanding of how a combination of springs work, and how disk springs themselves work, is needed. Using springs in combination is a way to change the spring rate in a very predictable fashion. Springs can be used in many different combinations but are simplified into two basic groups, series and parallel. Series combinations decrease the spring rate by placing the springs on top of each other. This can be represented mathematically by the following equation $1/R_{eq}=1/R_1+1/R_2+, \ldots 1/R_n$ where $R_{eq}$ is the new combined rate; $R_1$ $R_2$ and $R_n$ are the springs in series. Parallel combinations are when springs are placed side by side, which increases the total combined spring rates. This also can be represented by the equation $R_{eq}=R_1+R_2+, \ldots R_n$ where $R_{eq}$ is the new combined rate; $R_1$, $R_2$ and $R_n$ are the springs in parallel.

After looking at the two equations is can be seen that any spring rate can be changed to a desired rate. If a spring is not at its desired rate then a second spring could be used in combination to achieve the desired rate with relative accuracy depending on the accuracy of the measured rate of the initial two springs. In application this technique may not be practical due to space constraints of the individual application. For example to cut a spring's rate in half a spring of the same rate is placed on top of the original spring, or in series, but the total height of the spring combination also increases by two. The same space problem for parallel combinations is also true, with the new spring taking up space next to the original spring.

Disk springs, such as Belleville washers, could be used instead of coil springs. This type of disk spring is like a washer that's had its middle pushed up. This type of spring is not as common as a coil spring, but is still used quite frequently. One of its most common applications is as a washer that applies force when used under the head of a bolt. As the bolt is tightened the disk spring flattens, flexing the spring, thus applying force to the head of the bolt, and stops the bolt from backing out. Disk springs can also be used like coil springs when they are stacked vertically in a column and then compressed together all as one single spring. This is quite handy because the rate of the stacked spring is dependent on the number of disks and how they are arranged. Disk springs used in columns however do have their disadvantages, they are normally used only when small displacements are needed, and accurate guidance over the entire length of the column is essential. Disk springs rates are dependent on the geometry of the disk and are linear for height-to-thickness ratios of around 0.4. Disk springs have a tolerance that is slightly higher than that of coil springs, around 20%. Disk springs do not handle dirty environment as well as coil springs because each disk rubs against the next disk as they flex. This can make the spring rate change due to an increase in fiction or reduce the life of the spring because of wear. The overall accuracy and consistency of the rate of a column of disk springs is much less than that of coil springs due to this friction. Therefore stacked disk springs are not used as preferred as other embodiments of the present invention.

A technique has been found to combine two of the previous methods that allows one to adjust rate and take up as little space as possible, and still not affect the integrity of the coil spring. This is ideal for any application that has a spring that is working in line with the applied fore. This technique involves using standard coil springs and adjusting them with disk springs. This allows a spring that has a high rate to be adjusted down to a desired lower rate. If the rate is within a small percentage of its total rate, such as ±7%, then only a few disk springs are needed to do this.

As stated before, the spring rate of a column of disk springs is dependent on the number of disks and their arrangement. These disk springs can be arranged so that they work in parallel or series. This allows combinations of one size disk spring to be used to correct one size coil spring. This reduces cost because an inexpensive coil spring can be corrected by a few very inexpensive disk springs.

A single disk spring like a coil spring has a rate, which is dependent on deflection and load. These disk springs, unlike coil springs, can be arranged in a quite unique manner that allows both parallel and series combinations to be achieved in a vertical column. To explain this it is best to look at the simple case, which involves only two disks springs. If both disks are stacked with the same orientation we find that the rate has increased by two. This is an example of parallel stacking. If the disks are stacked facing in opposite directions we find that the rate has been reduced by half, this would be an example of a series stack. This series and parallel stacking works for any number of disks. If we look at more than just two springs we quickly find that there are many more different combinations possible. This allows for one size disk spring to be used in multiple column arraignments, which have many different rates.

The combination of disk springs and coil spring can be broken up into to two separate springs that are in series. First the coil spring or the main spring, and then the column of disk springs that are called the adjustment springs. Because the main and adjusting springs are in series, the new combined rate is always lower than that of the rate of just the main spring. This means that the main spring can only be adjusted down, not up with this technique. This will affect the design of the rate and tolerance of the main springs. If the spring rate can only be reduced then the main springs should be designed with a minimum tolerance of the rate needed, and a rate tolerance drift that is only positive. For example if a rate of 100 (lb/in) were needed, then the spring would be designed to have a minimum rate of 100 (lb/in) and a positive tolerance of 10%, or a rate that is between 100-110 (lb/in). The main spring can then be lowered by the adjustment springs until it is within a new tighter design tolerance.

The disk spring must be designed so the coil spring can be adjusted with a minimum amount of height change; this means that the use of as few disk springs is essential. To make this easier the disk springs are made to change the coil springs rate by a desired percentage. The percentage change chose for a single disk spring is 2% to make things as simple as possible. This means that an ideal coil spring and an ideal single adjustment spring together have a combined rate of 98% of the coil spring by itself. The disk springs can then be arranged so that the rate can be adjusted from 1% to 10%. The following is a table of different series and parallel combinations and their combined rates.

TABLE 1

Disk Spring Arrangements

| Disk Arrangements | % Rate Change of Coil Spring | Number of Disks | Old Coil % of Ideal Rate | New combined Rate |
|---|---|---|---|---|
| 5S | 10% | 5 | 110% | 100% |
| 2P-4S | 9% | 6 | 109% | 100% |
| 4S | 8% | 4 | 108% | 100% |
| 2P-3S | 7% | 5 | 107% | 100% |
| 3S | 6% | 3 | 106% | 100% |
| 2P-2S | 5% | 4 | 105% | 100% |
| 2S | 4% | 2 | 104% | 100% |
| 2P-1S | 3% | 3 | 103% | 100% |
| 1 | 2% | 1 | 102% | 100% |
| 2P | 1% | 2 | 101% | 100% |
| 0 | 0% | 0 | 100% | 100% |

S—Series
P—Parallel

From this table any coil spring with a rate between 100%-110% of the design rate can be adjusted down to the goal rate. FIG. 9 depicts the arrangement of four Bellville washers in series, referred to in the third entry in Table 1 above. FIG. 9a depicts the arrangement of two Bellville washers in series and two in parallel, referred to in the sixth entry in Table 1 above.

Other design factors are the size and dimensions of the disk spring. This is dependant on space requirements and the working range of the disk spring. The space requirements depend on the applications that include ID and OD dimensions. The disk spring is also designed so that the disk is deflected 50% of total solid displacement at the working load. This allows room for the disk to move and ensure that it does not go to its solid height. Thickness of the disk should be chosen to allow for the thickness to height ratio to be as close to 0.4 as possible. The 0.4 ratio will make the disk spring as linear as possible. In some applications this may not be possible, but because the disk springs are only used as slight adjusters, this nonlinear rate has only a small effect on the linear rate of the main coil spring. Guidance is another factor that must be considered when using this technique. The disk springs must be contained so when they are flexed their rate will stay as consistent as possible. The most practical method of guidance is with a center alignment guide. With this type of guidance the disks and main spring are designed to have the correct clearance on the center guidance shaft. Both disk and coil springs are free to be compressed with as minimal friction as possible. Guidance may also be achieved with an exterior guide, which is less desirable because the disk spring OD tends to be larger than the coil spring. Exterior and interior guidance can also be used together with the disk being guided on the outside and the coil spring guided on the inside.

The following is a step-by-step example of how this technique is applied. For this example a target rate has been chosen of 100 (lb/in) and an allowable tolerance of ±2%.

1. First the main spring is designed having a rate of 108 (lb/in) with a tolerance of ±7%. This is a standard inexpensive coil spring that has a standard rate tolerance. The reason why the rate of 108 (lb/in) is chosen is to ensure that the main spring will not drift below 100 (lb/in) target rate.

2. An adjustment disk spring is then chosen by finding a rate that will adjust the main spring by 2%. This is done to allow for the minimum amount of adjuster spring combinations. The nominal spring rate of the main spring is 108 (lb/in) and if we adjust this by 2% we then have a rate of 105.84 (lb/in). We need a disk spring that adjusts this rate by 2% so we can use the equation for series springs to find this.

$$\frac{1}{105.84(\text{lb/in})} = \frac{1}{108(\text{lb/in})} + \frac{1}{R_{disk}}$$

This is then solved for $R_{disk}$=5,292 (lb/in). A disk spring with a rate of 5,292 (lb/in) ±15% can then be ordered that has an OD and ID dimension that best fits the space allowances of the application. Looking at the two spring rates we notice that 108 is approximately 2% of 5,400, which lends itself to a very quick and easy approximate formula.

$$R_{disk} \cong \frac{108}{2\%}$$

3. When the disk springs are designed one other factor must also be taken into consideration. The load at which the main coil spring achieves maximum stress must be equal to or less than the load at which the disk springs reach their maximum stress. This will allow the coil spring to be used at its intended deflection ranges without over stressing the disk springs.

4. Next we measure the coil spring to find the exact spring rate. From this and the series formula we can find what rate the adjusting spring rate needs to be. If the coil springs rate is measured and found to be 110 (lb/in) we can then find the adjustment rate.

$$\frac{1}{100(\text{lb/in})} = \frac{1}{110(\text{lb/in})} + \frac{1}{R_{adjment}}$$

From this equation we find that $R_{adjust}$=1100 (lb/in).

5. We now arrange the disk springs in a way that will produce the closest match for the desired adjustment rate. The best arrangement is 5 disk springs in series. This makes the new adjustment rate $$\frac{1}{R_{adjust}} = \frac{5}{5292(\text{lb/in})} \text{ so}$$

$R_{dajust}$=1058.4 (lb/in).

6. We then can calculate the new combined rate for the spring assembly with the series equation.

$$\frac{1}{R_{combined}} = \frac{1}{110(\text{lb/in})} + \frac{1}{1058.4(\text{lbs/in})}$$

Which gives $R_{combined}$=99.65 (lb/in)

7. The new calculated combined spring rate is 0.36% low but it is still within the desired ±2% of the 100 (lb/in) target rate. The individual disk springs are also going to have a tolerance, which will make the measured spring value slightly different than that of the calculated value. The rate tolerance of each individual spring disk will only be applied to the small amount of adjustment. This means that if the main spring was adjusted down by 10% and the adjustment disk springs had a rate tolerance of ±15%, then the final combined rate would have a 10% of a ±15% tolerance or ±1.5% total tolerance. The new combined rate of the above example spring assembly is now 99.65 (lb/in) ±1.5%.

Each spring that is adjusted is brought into tolerance by the disk springs only by the amount of the original error in the main spring. This will make the total error in the combined springs dependant on the amount of initial coil spring error. If a main spring was dropped by 2% to achieve a final rate then the error of the adjustment springs will only affect the combined rate by 2% of the disk spring tolerance. As the main springs become further out of tolerance then the disk spring error will affect the final combined rate tolerance that much more.

In the above application of the low blow-down safety relief valve this has proven to work extremely well. The spring rate can be chosen for a particular valve and then is ordered with standard tolerances. This spring then can be measured and then adjusted with disk springs very quickly. Each different spring ordered can be adjusted by using a chart like Table 1 to quickly adjust the spring down to the desired rate. In the valve application the coil spring was originally guided by an adjustment screw running the spring's center. The disks springs are made with the center hole bigger to allow for clearance and a bushing above guides the disk springs on there outside diameter. The disks act directly on top of the spring, which allows for minimal vertical space requirements. The first disk spring that is above the main spring must be placed in a manner that allow the center of the disk spring to be in contact with the end of the main spring and the outside diameter must be higher than the end of the main spring. This will dictate how the disk springs will be arranged above the main spring.

FIGS. 10 and 11 illustrate additional preferred embodiments of this invention. Reducing the wire cross sectional area produces a reduction in spring rate. This is done by machining or grinding the outside or inside of a standard spring until the desired rate is achieved. This changes the spring's normal round cross section to one that has a flat on one side. This may make the spring more susceptible to corrosion due to the exposed surface of the spring. Also, coil springs are heat treated when they are made so the heat generated in this operation may affect the internal stress of the spring wire. As shown in FIG. 10, a standard wound coil spring having a rate tolerance of ±7% can readily be reduced to ±2% by removal of metal from the outside diameter of the spring. For example, if a set spring was required to have a spring rate of 100 lbs/in. ±2%, a coil spring would be procured having a design rate of 107 lbs/in. Then, the spring lot would be carefully measured to determine the statistically accurate mean rate. Note that the actual variation of spring rates within a batch of springs wound at the same time is small, perhaps a ±2% variation. However, the next batch of springs wound with a different batch of spring wire and a slightly different spring winding machine set up would produce as much as a ±7% variation from the nominal of 107 lbs/in. rate. The statistical mean is then used as a reference to drop the rate of the batch of springs. If each of the springs of the initial batch is within the small ±2% then the modified springs should still be within ±2% of each other but at a new lower mean rate.

Equations for predicting how much of a reduction in rate could be produced with the use of test springs that a reduced incrementally and measured between each reduction. This data then can be graphed and an equation can then be generated that can predict a reduction in rate for any reduction in spring diameter. Equations for stress are available, which must be kept within the elastic limit of the spring material. Metal removal from the inside or outside diameter of a coiled spring can be accomplished by a variety of methods such as grinding, boring, machining, etc.

Figure 12:
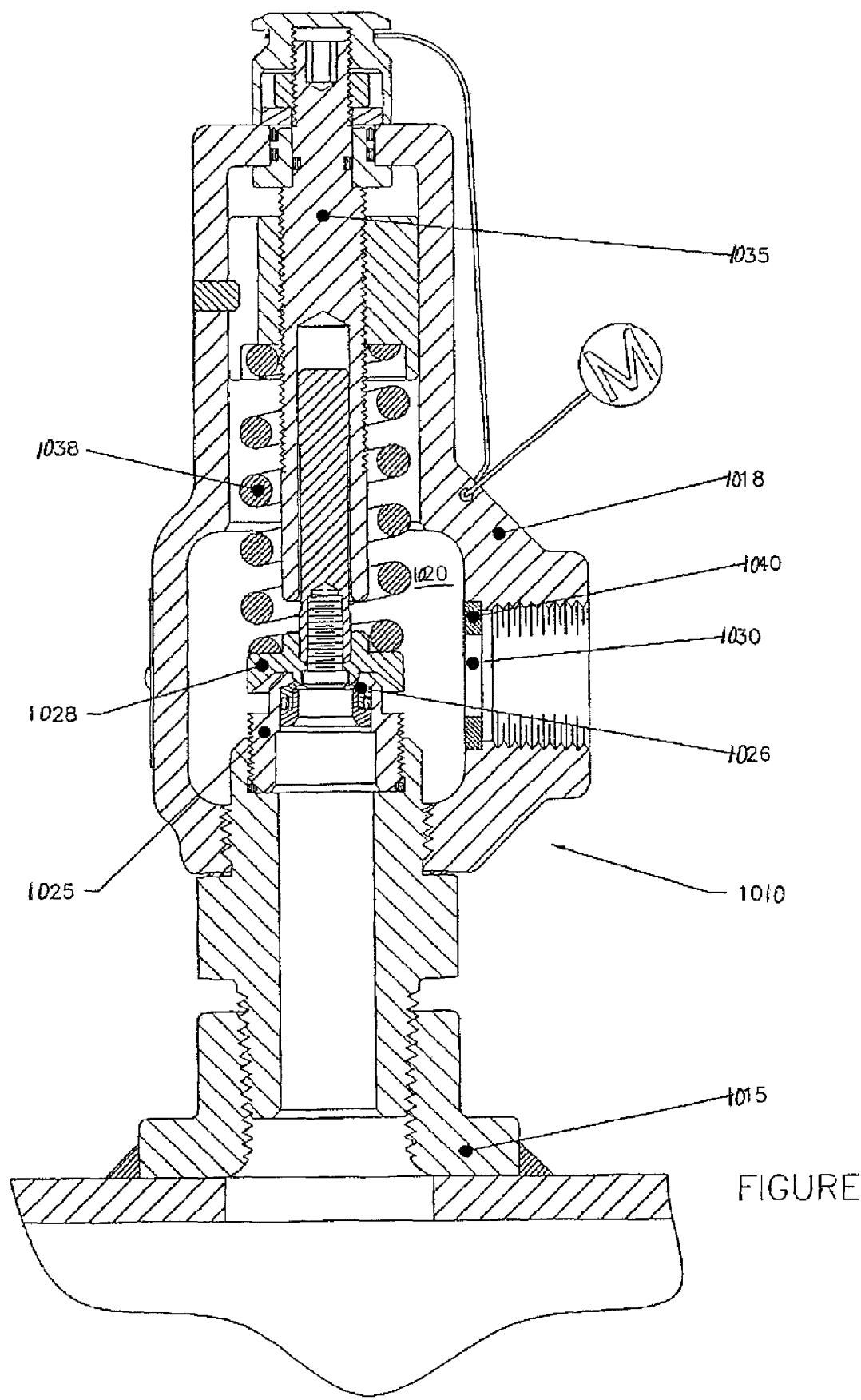
FIG. 12 is a cross-sectional view of a ninth preferred embodiment of a low blow-down snap-type safety relief valve in a closed position, depicting a basic coil spring wherein the inside diameter is enlarged by mechanical means to reduce the rate tolerance from ±7% to ±2%.

FIG. 12 shows an additional preferred embodiment of this invention. This design utilizes a standard coil spring in which the spring rate tolerance is reduced by manually enlarging the mean spring diameter of several of the central coils. Uncoiling a coil spring will increase the mean diameter and reduce the number of coils. This reduces the spring rate because of the increase in mean spring diameter. Uncoiling also increases the ID and OD dimensions of the spring, which makes this technique less desirable. The spring also has added stress do to the uncoiling operation, which may require a stress relieving operation. If a spring rate of 100 lbs/in. ±2% were required, a lot of springs would be wound to a 107 lbs/in. ±7% rate tolerance. The central coils would then be expanded mechanically by an expanding internal mandrel, or a torquing action applied to the ends of the spring, tending to unwind the original coil. Enlarging the mean spring diameter or a group of central coils would bring the actual spring rate to the desired 100 lbs/in. ±2%.

It should be appreciated that the apparatus and method of the present invention is capable of being incorporated in the form of a variety of embodiments, only a few of which have been illustrated and described above. For example, the modified springs can be used in other safety relief valves besides those disclosed herein. The invention may be embodied in other forms without departing from its spirit or essential characteristics. The described embodiments are to be considered in all respects only as illustrative and not restrictive, and the scope of the invention is therefore indicated by the appended claims rather than by the foregoing description. All changes that come within the meaning and range of equivalency of the claims are embraced to be within their scope.

The invention claimed is:

1. A safety relief valve comprising:
   a) a body comprising a chamber therein and an inlet and an outlet, the inlet comprising an inlet valve seat;
   b) a disk member closable on the inlet valve seat; and
   c) a mechanism in the body biasing the disk member to rest on the inlet valve seat with a set force such that when the pressure in the inlet exceeds a set pressure resulting from the set force, the disk member is lifted from the inlet valve seat, the disk member and inlet being configured to provide a huddling chamber, the mechanism comprising a combination of a coil spring and one or more disk springs stacked in series with the coil spring, wherein the spring rate of the coil spring is less than the spring rate of the lowest spring rate of the one or more disk springs.

2. The safety relief valve of claim 1 further comprising a secondary orifice between the chamber and the outlet, the inlet being configured so that gas flows from the inlet valve seat into the chamber in a sonic flow when the valve opens due to a pressure in the inlet exceeding the set pressure and the secondary orifice being sized so that gas flows from the chamber through the secondary orifice in a sonic flow when the valve opens due to a pressure in the inlet exceeding the set pressure.

3. The safety relief valve of claim 2 wherein the secondary orifice is formed in a plate that is inserted into the body of the safety relief valve.

4. The safety relief valve of claim 2 wherein the secondary orifice is formed integral with the body of the safety relief valve.

5. The safety relief valve of claim 1 wherein the mechanism further comprises an adjustment screw acting against the combination of coil spring and one or more disk springs.

6. The safety relief valve of claim 5 wherein the adjustment screw has a bore therein that receives a stem on the disk member when the disk member is lifted from the inlet valve seat.

7. The safety relief valve of claim 1 having a blow-down value of less than about 10%.

8. The safety relief valve of claim 1 having a blow-down value of less than about 5%.

9. The safety relief valve of claim 1 comprising a plurality of disk springs.

10. The safety relief valve of claim 9 wherein at least two of the disk springs are stacked to operate in series.

11. The safety relief valve of claim 9 wherein there are at least three disk springs, and at least two of those are stacked facing in an opposite direction to the third disk spring.

12. A safety relief valve comprising:
   a) a body comprising a chamber therein and an inlet and an outlet, the inlet comprising an inlet valve seat;
   b) a disk member closable on the inlet valve seat; and
   c) a mechanism in the body biasing the disk member to rest on the inlet valve seat with a set force such that when the pressure in the inlet exceeds a set pressure resulting from the set force, the disk member is lifted from the inlet valve seat, the mechanism comprising a combination of a coil spring and a plurality of disk springs stacked in series with the coil spring, wherein at least two of the disk springs are stacked to operate in parallel.

13. A low blow-down safety relief valve comprising a body having an inlet, a disk member closable on the inlet, an outlet, the disk member and inlet being configured to provide a huddling chamber, and the outlet being located in the body radially of the huddling chamber, and a mechanism biasing the disk member on the inlet comprising an adjustment screw that provides an unchanging full open stop position for the disk member, the mechanism further comprising a spring having a modified spring rate produced by combining one or more disk springs with a coil spring, with the one or more disk springs being stacked in series with the coil spring, wherein the spring rate of the coil spring is less than the spring rate of the lowest spring rate of the one or more disk springs.

* * * * *